United States Patent [19]
Schlosser et al.

[11] Patent Number: 5,408,834
[45] Date of Patent: * Apr. 25, 1995

[54] ICE MAKING MACHINE

[75] Inventors: Charles E. Schlosser, Manitowoc; Lee G. Mueller, Kewaunee; Gregory McDougal, Manitowoc, all of Wis.

[73] Assignee: The Manitowoc Company, Inc., Manitowoc, Wis.

[*] Notice: The portion of the term of this patent subsequent to Mar. 1, 2011 has been disclaimed.

[21] Appl. No.: 201,758

[22] Filed: Feb. 25, 1994

Related U.S. Application Data

[63] Continuation of Ser. No. 989,791, Dec. 11, 1992, Pat. No. 5,289,691.

[51] Int. Cl.⁶ .............................................. F28G 13/00
[52] U.S. Cl. ........................................... 62/78; 62/303
[58] Field of Search .................. 62/78, 303; 134/104.1

[56] References Cited

U.S. PATENT DOCUMENTS

| | | | |
|---|---|---|---|
| 3,369,376 | 2/1968 | Kious | 62/303 |
| 3,638,448 | 2/1972 | Raymer | 62/233 |
| 3,733,840 | 5/1973 | Pearl et al. | 62/78 |
| 4,058,383 | 11/1977 | Peterson | 62/85 |
| 4,169,358 | 10/1979 | Hansen et al. | 62/154 |
| 4,363,223 | 12/1982 | Abbott | 62/303 |
| 4,465,210 | 8/1984 | Iwanami | 222/148 |
| 4,480,441 | 11/1984 | Schulze-Berge et al. | 62/138 |
| 4,489,567 | 12/1984 | Kohl | 62/138 |
| 4,498,607 | 2/1985 | Jaschinski | 222/146.6 |
| 4,550,572 | 11/1985 | Schulze-Berge | 62/138 |
| 4,573,325 | 3/1986 | Chiu et al. | 62/129 |
| 4,628,974 | 12/1986 | Meyer | 141/129 |
| 4,644,757 | 2/1987 | Hida et al. | 62/188 |
| 4,739,233 | 4/1988 | Marcade | 318/558 |
| 4,767,286 | 8/1988 | Kohl et al. | 417/423 R |
| 4,774,814 | 10/1988 | Yingst et al. | 62/126 |
| 4,774,815 | 10/1988 | Schlosser | 62/149 |
| 4,785,641 | 11/1988 | McDougal | 62/233 |
| 4,840,202 | 7/1989 | Kito et al. | 62/303 |
| 4,845,955 | 7/1989 | Taylor | 62/71 |
| 4,852,359 | 8/1989 | Mazzotti | 62/68 |
| 4,872,317 | 10/1989 | Reed | 62/135 |
| 4,878,361 | 11/1989 | Kohl et al. | 62/352 |
| 4,898,002 | 2/1990 | Taylor | 62/71 |
| 4,907,422 | 3/1990 | Kohl et al. | 62/352 |
| 4,932,216 | 6/1990 | Ito | 62/129 |
| 4,946,073 | 8/1990 | Brill et al. | 222/129.4 |
| 4,959,967 | 10/1990 | Lanzani | 62/138 |
| 5,193,357 | 3/1993 | Kohl et al. | 62/347 |
| 5,289,691 | 3/1994 | Schlosser et al. | 62/78 |

OTHER PUBLICATIONS

Advertising Form No. 6194-2 by Manitowoc® disclosing ice cubers, cube dispensers, cube storage bins, 20 pages, 1990.

Service Technician's Handbook on Manitowoc® Ice Machines, 143 pages, 1989.

Manitowoc advertising brochure disclosing ice cube machines, ice cube dispensers, storage bins and water filter systems, 16 pages, 1989.

Owner/Operator Use And Care Guide for Manitowoc® Series G600/G800 ice machines, 18 pages, Mar. 1990.

Service Manual for Manitowoc® Series G600 ice machines, 74 pages, Oct. 1990.

Installation-owner/operator use and care guide for Manitowoc® ice machines AuCS ™ Accessory (Automatic Cleaning System), 14 pages, 1992.

Specification sheet for AuCS ™ Automatic Cleaning System for Manitowoc® ice machine, 2 pages, 1992.

*Primary Examiner*—William E. Tapolcai
*Attorney, Agent, or Firm*—Steven P. Shurtz; Willian Brinks Hofer Gilson & Lione

[57] ABSTRACT

An automatic ice making machine is disclosed having a coolant/refrigerant system, a water/ice system, a cleaning/sterilizing system and a microprocessor operated control system interconnecting the above systems. Methods for automatically cleaning the ice maker's water/ice systems and establishing safeguards and monitoring of system readiness and operation are also provided.

30 Claims, 15 Drawing Sheets

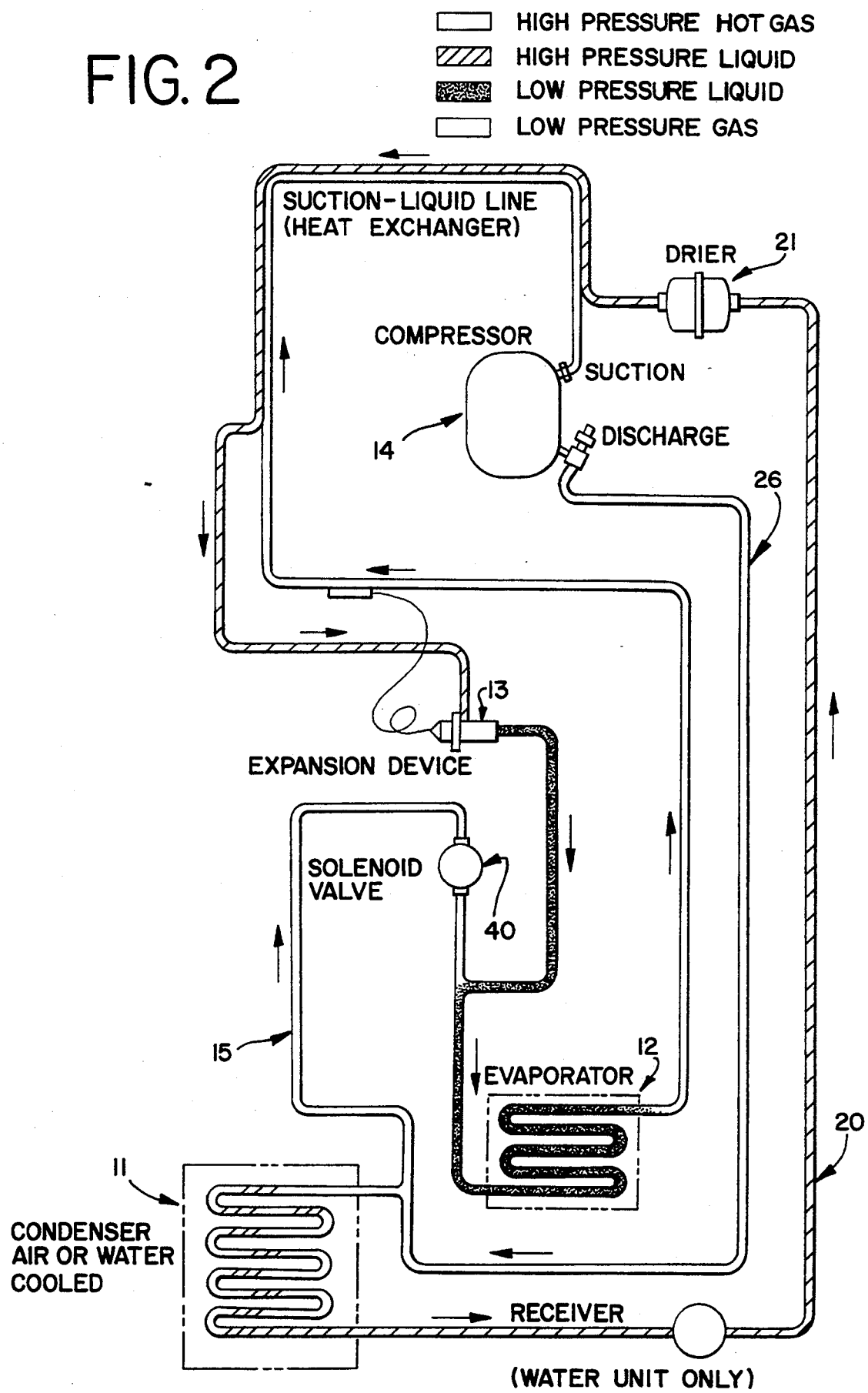

ICE MAKING MACHINE

CROSS-REFERENCE TO RELATED APPLICATION

This application is a continuation of application Ser. No. 07/989,791, filed Dec. 11, 1992, now U.S. Pat. No. 5,289,691.

FIELD OF THE INVENTION

The present invention relates to automatic ice making machines, and more particularly to automatic ice making machines with cleaning systems.

BACKGROUND OF THE INVENTION

Automatic ice makers run essentially continuously using two basic systems. These systems are the coolant recycle refrigerant system and the water/ice system. Fouling problems in the water/ice system occur which decrease efficiency and require down-time for maintenance and cleaning. The improvements in the ice making machines of this invention greatly curtail the necessity for downtime and provide for cleaning and sterilization of the machine which, enhances the continuity and efficiency of operation of ice making machines.

THE COOLANT/REFRIGERANT SYSTEM

The coolant recycle refrigerant system is primarily composed of a compressor, a condenser, an expansion valve, an evaporator and interconnecting lines therefor. In addition this coolant/refrigerant system can also contain a reservoir for the refrigerant being used, a refrigerant drier, a hot gas solenoid valve to recycle hot gases through the evaporator after ice has been formed, thereby releasing the ice from the evaporator plate, and interconnecting lines therefor.

In operation, a coolant/refrigerant system contains an appropriate refrigerant, often including carbon dioxide or various halogenated hydrocarbons, particularly the fluorocarbons or fluoro, chlorocarbons, and begins operation during what is referred to as the freeze cycle. In the freeze cycle the compressor receives a vaporous refrigerant at low pressure and compresses it, thus increasing the temperature and pressure of this refrigerant. The compressor then supplies this high temperature, high pressure vaporous refrigerant to the condenser where the refrigerant condenses, changing from a vapor to a liquid, and in the process the refrigerant releases heat to the condenser environment. In large ice making systems the condenser may be located out of doors far away from the compressor operating within the confines of the ice maker machinery.

The liquid refrigerant is normally supplied from the condenser to the evaporator where the liquid refrigerant changes state to a vapor and, in the process of evaporating, absorbs latent heat from the surrounding environment. This cools the evaporator and any materials in close proximity or in contact with the evaporator. The refrigerant is converted from a liquid to a low pressure vaporous state and is returned to the compressor to begin the cycle again. During this so-called freeze cycle the evaporator plate, or ice tray or mold, of a typical ice maker, which mold is in contact with the evaporator or in close proximity thereto, is cooled to well below 0° C. the freezing point of water. Often temperatures below $-10°$ C. or even temperatures of $-25°$ C. or below can be achieved.

During the freeze cycle the ice making mold of the typical ice maker has water contacted and pumped over it to build up the desired ice shapes, pieces, or forms.

THE WATER/ICE SYSTEM

The water/ice system primarily comprises at least a water supply, a water reservoir or water sump, means for discarding excess water from the circulating water system, such as a drain or overflow system, each sometimes equipped with a water dump solenoid valve, a water circulation or recirculation pump or other means for circulating water through the water/ice system, a water distributor, or means for distributing the circulated water across the ice-forming mold or evaporator plate, and an ice thickness sensing probe or means for detecting the thickness of the ice formed so as to terminate a freeze cycle and begin a harvest cycle. These water/ice systems may also contain a water curtain, the purpose of which is to direct water flowing over the ice-forming mold or evaporator plate onto said plate or mold and collect and distribute unfrozen water into the water reservoir or sump. After the ice has been formed appropriately, the ice thickness sensing probe is activated, indicating complete formation of the ice sheet, pieces, cubes or shape desired. A harvest system is then initiated which stops the flow of coolant/refrigerant and begins an ice recovery process, such as, for example, beginning a hot gas recycle into the evaporator which heats the evaporator plate or ice-forming mold thereby releasing the ice which falls into an ice collector reservoir.

ICE MAKING SYSTEMS

The above described ice making systems, including systems having a harvest cycle refrigerant control system basically described above, are additionally described in U.S. Pat. Nos. 4,907,422 and 4,878,361. In general, these systems provide for ice making machines operating at relatively low temperatures, i.e., below 50° F. ambient, having head pressure control valves provided in part to maintain a minimum head pressure to insure that compressor heat will be available for the next ice harvest cycle, and said valve generally being designed to prevent back up of liquid refrigerant into the condenser during cold temperatures.

During the harvest cycle the vaporous refrigerant is supplied to the evaporator through a hot gas valve contained in the coolant/refrigerant system. The valve typically has a fixed orifice acting as a metering device. This normally functions satisfactorily in self-contained systems with relatively small refrigerant charges, providing acceptable harvest times without returning unacceptable amounts of liquid refrigerant to the compressor.

In systems having large refrigerant charges, the discharge pressure during a harvest cycle tends to be higher at elevated ambient outdoor temperatures. As a result, more refrigerant may flow through the fixed orifice in the hot gas valve and into the cold evaporator where it condenses. If this condensed refrigerant reaches the compressor, it can damage this compressor and greatly affect the efficiency of the operation of the compressor. Therefore, as taught in the patents cited above, the system normally controls the amount of refrigerant circulated between the compressor and the evaporator during the harvest cycle. The amount of refrigerant varies from system to system depending upon operating conditions, such as the size of the evaporator.

The amount of refrigerant can be monitored, for example, by the compressor's suction pressure, and additional refrigerant from the condenser is added as needed. Ice making systems such as those described in U.S. Pat. Nos. 4,907,422 and 4,878,361, as well as ice making machines taught in U.S. Pat. Nos. 4,898,002 and 4,845,955, may be further enhanced by improvements such as a drain valve control as taught in U.S. Pat. No. 4,785,641 and a particular advantageous pump assembly as taught in U.S. Pat. No. 4,767,286. Improvements for harvest pressure regulator valve systems, as taught in U.S. Pat. No. 4,774,815, may further be improved with anti-blocking controls as taught in U.S. Pat. No. 4,550,572.

Also, ice cube making machines having vertical, open faced freezing molds over which water is circulated from an underlying trough or sump to build up ice, as taught in U.S. Pat. No. 4,489,567 can be incorporated as the evaporator plate mentioned above. Likewise harvest controls, such as those controls taught in U.S. Pat. No. 4,480,441, may also be incorporated into the ice making machines of this invention. In addition, the evaporator and ice molds may be formed of integral, extruded aluminum parts, as taught in U.S. Pat. No. 5,193,357.

All of the U.S. Patents and applications cited above are incorporated herein by reference.

THE PROBLEM OF LONG TERM OPERATION

Even after all of the improvements in ice making machines brought about by the careful design set forth in the above cited and incorporated patents, problems still exist which can impede the operation of an ice making machine, particularly an ice making machine running automatically and for extended periods of time. These problems include the fact that during extended use, the water/ice system has a tendency to accumulate soils, dirts, dusts and water hardness components, such as calcium carbonate and magnesium salts, onto the surfaces of the water/ice system. Occasionally, depending upon the environment in which the ice making machine is located and the quality of the waters supplied to the ice making machine, various biological deposits can form, including microbiological growths, yeast residues and slimes.

When these dusts, soils, water hardness deposits and microbiological growths, yeast residues and slimes form on the water/ice system surfaces, they can impede the flow of water through the system and can cause decreased heat transfer efficiency, particularly on the evaporator plates and ice-forming molds on which ice is being made. When this happens, these water/ice system surfaces have to be cleaned to maintain proper ice making operations. This cleaning process normally requires dismantling that portion of the ice making machine containing these surfaces and washing and scrubbing the surfaces using acidic cleaner solutions. After this washing and scrubbing has been completed, much care must be taken to rinse the cleaning solution from the surfaces to avoid contact with ice later formed from these surfaces. Then the machine must be reconstructed. This is labor intensive, costly and inefficient.

In addition, problems still can occur even when machines are cleaned without disassembly by injecting acid solution into circulating waters and manually turning off the coolant/refrigerant system. When the fouled surfaces are washed with the cleaners, particularly when the cleaner is acidic, extended contact time with the metal surfaces and these acid cleaners can eat away and destroy, or most assuredly shorten the effective life of, these metal surfaces, and coatings thereon, such as the evaporator plate. These metal surfaces are primarily designed with alloys or metal plating that contain metals that conduct heat easily, such metals including but not limited to aluminum, copper, brass, irons and steels, and the like, all of which tend to corrode on contact with acid based cleaners. Also, cleaner residue can cause the ice formed immediately after such manual cleaning to be of poor quality.

SUMMARY OF THE INVENTION

An automatic ice-making machine has been invented that overcomes these problems. The invention is an electrically monitored and controlled ice making machine comprising:
  (a) a coolant/refrigerant system;
  (b) a water/ice system;
  (c) a cleaning system in communication with said water/ice system; and
  (d) an electronic controlling/monitoring system.

The electronic controlling/monitoring system has both monitoring and controlling capabilities to operate the coolant/refrigerant system, the water/ice system and the cleaning system. The cleaning system may be comprised of controlling system elements and water/ice system elements, or preferably also includes separate add-on devices capable of providing cleaning and/or sterilizing solutions, as required, to the water/ice system when operating in the cleaning mode.

In a preferred embodiment of our invention, we have an automatic self-cleaning/self-sterilizing ice-making machine having a freeze cycle, a harvest cycle, and a cleaning cycle, comprising:
  (a) a coolant/refrigerant system;
  (b) a water/ice system;
  (c) an automatic self-cleaning system in communication with said water/ice system comprising at least one cleaning/sterilizing solution storage reservoir and at least one cleaning/sterilizing solution injection mechanism, and appropriate connecting lines in communication with the water/ice system, and
  (d) an electronic controller comprising a microprocessor, a control panel, a power supply (or access thereto), at least one electronically operated sequence timer, at least one electronic switch, at least one counting mechanism and at least one electronic connector, and interconnecting power transmission lines.

ADVANTAGES AND BENEFITS OF THE INVENTION

An advantage and benefit provided by this invention is the operation of an automatic ice making machine with a cleaning cycle that sequences through at least one wash cycle and at least one rinse cycle. The preferred ice making machine has the capability of routinely cleaning and/or sterilizing surfaces in contact with circulating water within the water/ice system in a way to provide clean surfaces and minimize down time, maintenance costs and manpower involved in manually cleaning and scrubbing ice making or other water contacting surfaces which have become fouled by deposits as described above.

Another advantage and benefit of the preferred embodiment of the invention is its ability to operate in either continuous or intermittent cleaning cycles, either automatically or upon demand of the operator of the machine.

The invention herein also provides the advantages and benefits of a method for operating automatic ice making systems having both a freeze and harvest cycle and using the various mechanisms, including microprocessor controllers built into such an automatic ice making system, to control and monitor the cleaning system of this invention.

This cleaning system may use known and accepted cleaning and/or sterilizating solutions, or custom blended solutions, which are preferably stored in self-contained reservoirs and fed to the water/ice circulation system of the ice making machine. The preferred automatic cleaning system has a means for injecting the cleaning/sterilizing solutions into the circulating water, which can include a pump, injection valve or solenoid or check valve control means and appropriate interconnecting lines between the cleaning/sterilizing solution reservoirs and the water/ice system.

Other advantages and benefits will become known to the artisan through study of the following descriptions, the attached drawings and the instructions found in the Appendix, and the definitions and claims which follow.

BRIEF DESCRIPTION OF THE DRAWINGS

FIG. 2 provides a line diagram describing an embodiment for the coolant/refrigerant system of the ice machine of FIG. 1.

DETAILED DESCRIPTION OF THE DRAWINGS AND PREFERRED EMBODIMENTS OF THE INVENTION

DEFINITIONS

In this specification several terms are used to describe our invention. These terms generally have the meaning understood by a person familiar with the art.

The term cleaning/sterilizing is meant to indicate either the act of cleaning or the act of sterilizing, or both the act of cleaning and the act of sterilizing (either sequentially in any order, or simultaneously), as well as the cleaning and/or sterilizing system, and/or the operations of these systems. Cleaning in general may remove both non-biological and biological deposits and debris and sterilizing may remove and kill biological organisms contained in the deposits and debris. The term "self-cleaning" is meant to include both the concepts of cleaning and sterilizing. Cleaning may be accomplished, at least in part, by repeatedly rinsing the surfaces being cleaned with fresh water, or preferably may be accomplished by manually or automatically injecting a cleaner, or cleaning solution, into the circulating water, circulating for a period of time to induce cleaning and then rinsing with fresh water. Sterilizing actually kills at least a portion of microorganisms present.

The term "injection mechanism" is to include injection by pumping, gravity flow, venturi eduction or the like, using any combination of devices, such as positive displacement pumps, connecting liquid lines or tubing, check valves, solenoid valves, air gap arrangements, teed connecting lines, and the like.

The term "expansion device" includes an expansion valve, a capillary expansion tube, an electronic expansion mechanism, and any other device that permits, and preferably also controls, gas expansion in a coolant/refrigerant system.

The preferred ice-making machine 30 (FIG. 1) of the present invention is one that has a built-in cleaning routine, which, when activated, minimally goes through a multiple clean/rinse cycle automatically, and preferably goes through both a clean and multiple rinse cycle automatically. In addition, the ice machine 30 is preferably constructed so that an add-on automatic cleaning/sterilizing system 59 can be easily connected to the ice machine 30. The preferred add-on system contains cleaning/sterilizing solutions and injection devices, as well as further electrical controller features, as described below.

Figure 1A:
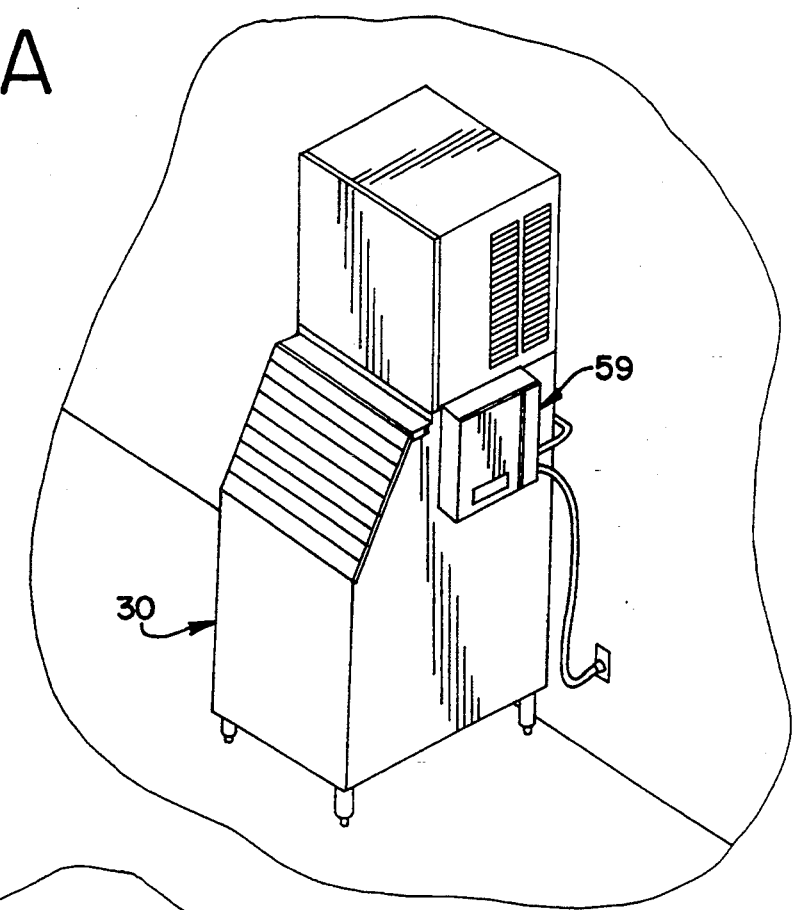
FIGS. 1A and 1B provide an illustration of the preferred embodiment of the automatic ice making machine of the present invention with the add-on cleaning/sterilizing system located in two different locations.
Figure 1B:
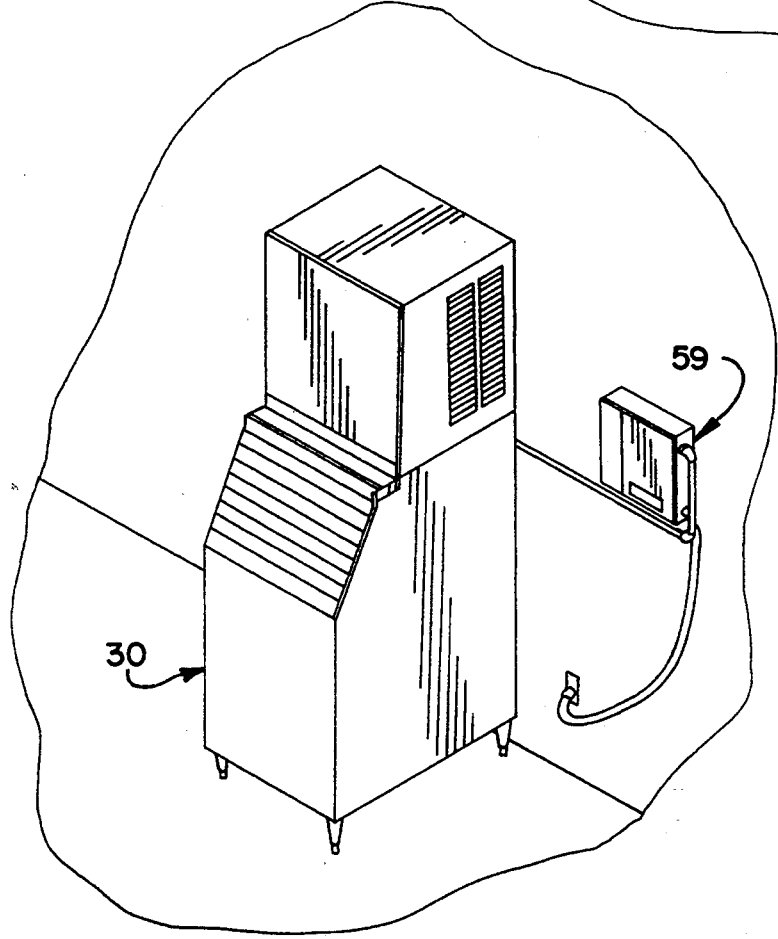

FIGS. 1A and 1B illustrate two separate embodiments for external location of an add-on self-cleaning system 59. The automatic self-cleaning system 59 of the preferred embodiment may also be built internal to the ice machine 30.

THE COOLANT/REFRIGERANT SYSTEM

An embodiment of the automatic ice making system's coolant/refrigerant system is illustrated in FIG. 2.

In FIG. 2, the coolant/refrigerant system comprises a condenser 11, an evaporator 12 and a compressor 14. Although only one evaporator is shown in FIG. 2, the present invention can be applied to ice making machines having two or more evaporators. FIG. 2 also illustrates a refrigerant supply line 20, a drier for the refrigerant 21, and an expansion device 13. The expansion device serves to lower the pressure of the liquid refrigerant.

When the compressor 14 is operating, high temperature, high pressure vaporous refrigerant is forced along a discharge line 26 back to the condenser 11. When the ice making system goes into its harvest cycle, a normally closed hot gas solenoid valve 40 opens and hot vaporous refrigerant is fed through line 15 into the evaporator 12.

Further details of the operation of this system can be gleaned from careful review of U.S. Pat. Nos. 4,878,361 and 4,907,422.

This coolant/refrigerant system in contact with the evaporator 12 also preferably contains a control circuit which causes the refrigeration system to cool down the ice mold to well below freezing at the start of the ice making cycle. This improvement is described in U.S. Pat. No. 4,550,572, referred to above.

As a result of this improvement, the ice-forming mold or evaporator plate in contact with the evaporator 12 is cooled well below freezing prior to the water pump in the water/ice system being energized to deliver water to the ice-forming mold.

THE WATER/ICE SYSTEM

The water/ice system normally comprises a water supply or water source, a water reservoir or sump, drain valves from the sump to a line draining to the drain or sewer, water circulation mechanism, water distribution means, and appropriate connecting lines. Water is distributed across an ice-forming mold, or evaporator plate, and forms ice thereon. Unfrozen water flows down the plate onto a water curtain and is returned to the water sump. When ice has been formed as required, it is harvested and falls into the ice bin.

Figure 3A:
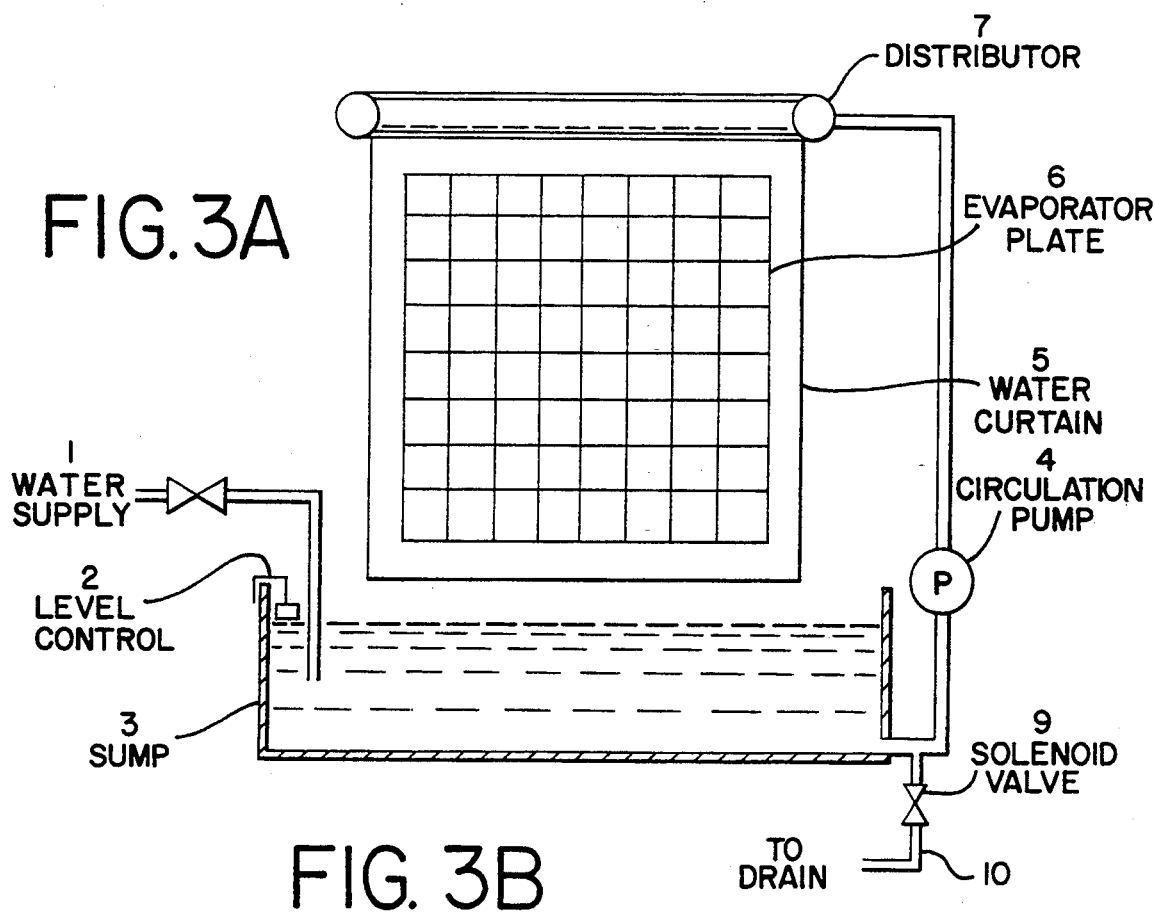
FIGS. 3A and 3B provide line diagrams and drawings for an embodiment of the water/ice system of the ice machine of FIG. 1.
Figure 3B:
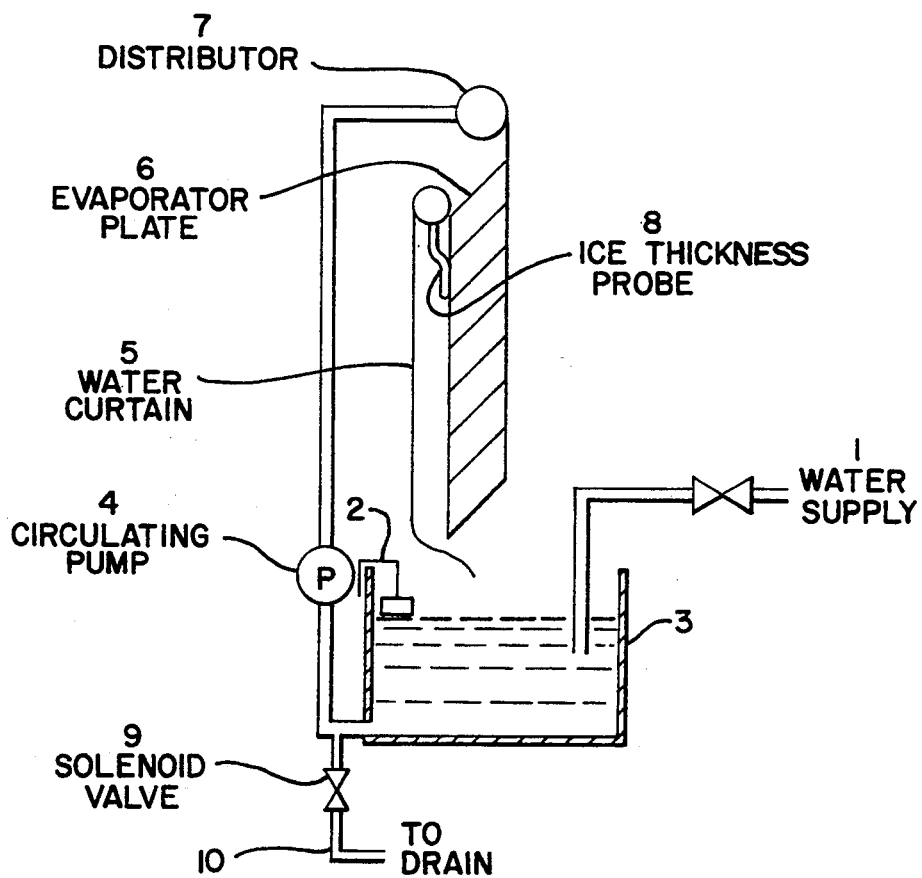

FIGS. 3A and 3B illustrate schematically an embodiment of the water/ice system, but does not show the ice collector bin or reservoir. In FIGS. 3A and 3B a water supply 1 provides source water, normally tap water or tap water which has optionally been treated by filtration, ion exchange or the like to improve its quality. Attached lines control and direct the flow of water from the water supply to flow into the water sump 3. The sump is equipped with a level controller 2, a solenoid dump valve 9, a drain line 10, and is connected and supplies a water supply to the suction side of the circulating pump, 4. Pump 4 circulates water from the sump to the distributor 7, where the water is directed over the evaporator plate 6 (also called the ice forming mold or ice tray).

The water from the distributor 7 is directed across the evaporator plate 6 and, if not frozen to form ice on a first pass, is collected by the water curtain 5. This collected water is allowed to flow down the water curtain into the water sump or water reservoir 3, where it is collected and again circulated by the circulating pump 4 to the distributor 7 and recycled across the ice tray during the freezing cycle.

Once the ice forming on the evaporator plate 6 has reached a certain thickness, the water flowing over the surface of that frozen ice product reaches contact with the ice thickness probe 8, which probe signals completion of an electrical circuit through the water in contact therewith. This signal, after a delay of at least 3 seconds, preferably approximately 5 to 10 seconds, and most preferably about 7 seconds, signals the controller to stop the freeze cycle. The ice thickness probe can be varied in its distance from the planar surface of the evaporator plate so as to provide ice having a thickness of from about ¼ inch to about 2 inches or more, preferably from about ½ to 1½ inches. This begins the harvest cycle.

In the harvest cycle the coolant no longer is pumped through the evaporator. Instead, the hot gas solenoid valve 40 is opened and operated according to FIG. 2 and the teachings of the patents cited and incorporated above to route hot vaporous refrigerant from the compressor 14 to the evaporator 12 through a discharge line 26 and bypass line 15, thereby heating up the evaporator plate. This causes the ice to release from the evaporator plate and fall against the water curtain and into the ice collection reservoir.

As can be seen, when the ice falls away from the evaporator plate structure, it must fall against the water curtain which is hinged. The water curtain is pushed away from the evaporator plate, thereby opening an electrical contact on the water curtain and allowing the ice to fall into the ice bin. The water sump, evaporator plate and water curtain are placed in such a way that the ice must fall against the water curtain and into the bin and cannot fall into the water sump or water reservoir. Similarly, water flowing down the curtain is directed away from the ice bin and into the water sump when the curtain is not displaced by the harvested ice.

After the ice falls into the bin, the water curtain springs or swings back into its original position, again making contact with the electrode placed thereon and sending a signal indicating that the harvest cycle is complete and that a new freeze cycle may begin.

On re-initiation of the freeze cycle, refrigerant/coolant is again pumped from the compressor through the coolant/refrigerant system to the evaporator to precool the evaporator for the period of time mentioned above, the hot gas solenoid valve is shut, and the water system begins its next cycle.

Periodically the solenoid drain valve 9 may be activated to drain the water in the water sump, which water has a tendency to build up concentration of water hardness chemicals, such as calcium salts and magnesium salts. Pure water freezes at higher temperatures than does water containing these, or other, dissolved salts. Also, water that contains higher levels of salts freezes at lower temperature and forms what the art terms "white ice." Fresh water can be then recharged to the water/ice system, which inhibits the formation of white ice. When the solenoid valve is activated to the open position, the water sump is drained, the solenoid is then closed (normally after a preset time has passed), and the fresh water recharges the system. Normally this fresh water recharging and recycled water discharge occur when the ice thickness probe indicates ice build up and the harvest cycle is initiated. This stops the coolant circulation and the water circulation.

In spite of the precautions mentioned above, the circulating water can lead to the build up of certain deposits on metal surfaces in the water/ice system. Particularly prone to build up of these deposits are the surfaces of the water sump, the internal surfaces of connecting lines from the sump to the circulating pump and through the circulating pump to the distributor, the distributor itself, and particularly the evaporator plate or ice molding surfaces or fins designed in the ice-forming trays made a part of the evaporator plate and in close proximity or attached directly to the evaporator external surfaces.

When these deposits form, they inhibit water flow, increase corrosion of the metal surfaces, inhibit heat transfer efficiencies, and generally cause poor operation of the ice maker, which, in turn, can lead to poor ice formation and in some cases bad tasting or bad looking ice (white ice).

CLEANING/STERILIZING SYSTEM

The cleaning/sterilizing system can minimally include control and monitoring capabilities permitting manual or automatic shutdown of the coolant system followed by emptying the water accumulated in the water/ice system by opening the drain valve 9 for a time sufficient to empty the water to the drain. After this time has passed, the solenoid drain valve 9 automatically closes, fresh water from supply 1 is added to the system, and water pump 4 begins circulation. Fresh water is circulated for a prescribed period of time, as programmed into the controller and the pump is turned off, the drain valve 9 is opened, and the cleaning water evacuated to the drain 10. The procedure is repeated at least 3 times, preferably from 4-6 times. If desired, a cleaning solution may be added manually to the first rinse water when machines of this invention are operating without the add-on cleaning/sterilizing systems 59 of FIGS. 1, 4 and 5.

The preferred self-cleaning system which is contained in or can be connected to the automatic ice machine 30 described above comprises at least one cleaning/sterilizing solution reservoir, at least one injection device servicing the reservoir, interconnecting feed lines from the reservoirs to the suction side of this injection mechanism, optional check valves or solenoid valves installed between the injection mechanism and the water system, and an injection line connector into the circulation water lines, or alternatively directly into the water reservoir or sump of the water/ice system. The cleaning/sterilizing injection line then feeds either or both the cleaning solution and sterilizing solution into the water/ice circulating system liquid. This line operates to feed the cleaning solution, or can operate to feed the sterilizing solution, or may operate to feed both cleaning and sterilizing solutions, in any sequence, or simultaneously.

Figure 4A:
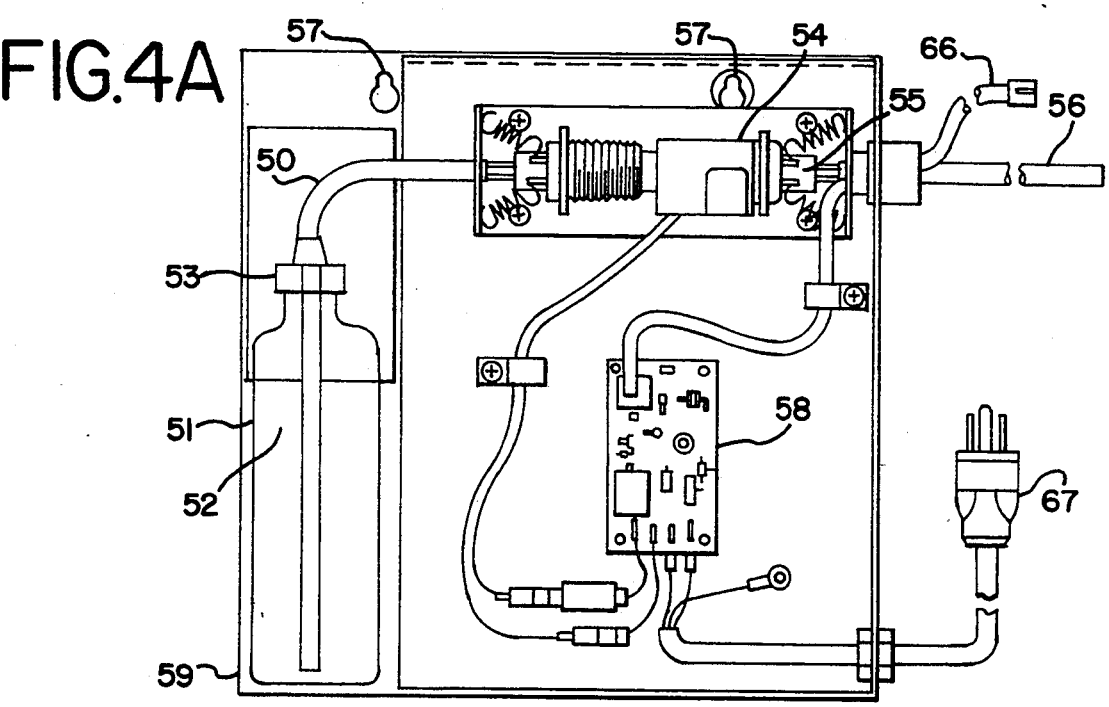
FIGS. 4A and 4B provide respectively an inside view and front view drawing of an embodiment of the cleaning/sterilizing system of the ice machine of FIG. 1.
Figure 4B:
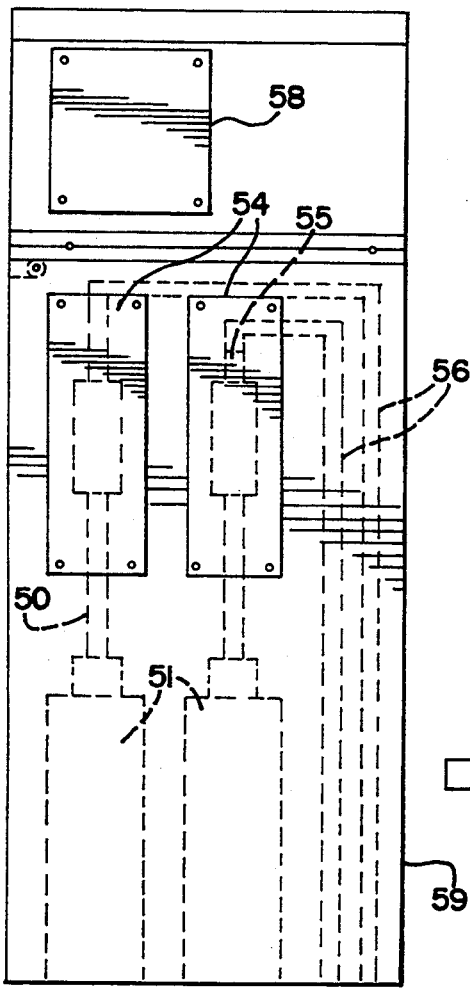
Figure 5:
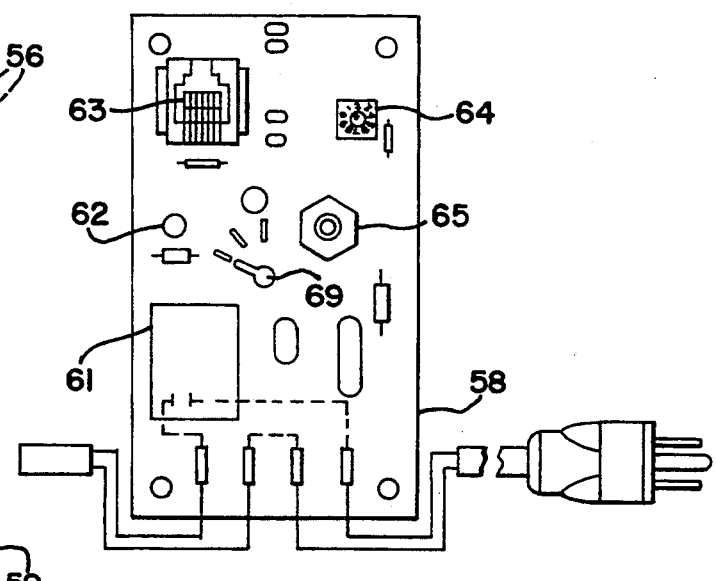
FIG. 5 provides further details for an embodiment for the control panel for the cleaning/sterilizing system of FIG. 4.

FIGS. 4 and 5 provide information regarding the cleaning solution/sterilizing solution storage vessels or containers, connecting lines, injection mechanism or devices, check valves, the cleaning/sterilizing injection lines, the electronic control panels, and the like.

In FIG. 4A, which is an inside view of the add-on box 59 of FIG. 1, a vinyl tube 50 is supplied to reach nearly to the bottom of a storage bottle or vessel 51. This vessel 51 can contain cleaning solution or sterilizing solution 52 or both if appropriate. The invention may operate with a single bottle or storage vessel with cleaning solution, a single storage vessel with sterilizing solution, or with multiple storage vessels and injection mechanisms for both cleaning and sterilizing solutions. Preferably, as seen in FIG. 4B, which is a schematic representation of a front view of the add-on system of FIG. 4A, the system contains two vessels 51, separate connecting lines, and separate injection pumps for separately storing and delivering cleaning and sterilizing solutions. The plastic cap 53 to the bottle 51 is tightly screwed to the bottle top and the bottle top is vented to prevent vacuum from crushing the solution containers as cleaning or sterilizing solution is withdrawn therefrom. Alternatively, the cap 53 is loosely fitted permitting vacuum break-through air leakage.

The vinyl tube 50 is connected to the suction inlet of an injection mechanism, or in FIG. 4A, a dispensing pump or injection pump 54, which dispensing pump 54 can be any positive displacement pump, such as a gear pump, a syringe pump, a piston pump, an oscillation pump, a peristaltic pump or any kind of pump or positive delivery device capable of delivering a measured amount of cleaning or sterilizing solution. In FIG. 4A, the outlet 55 of said dispensing pump 54 is connected to another delivery tube 56 which delivery tube (or injection line) is either fed directly to the water sump or may optionally be teed into the water supply line, preferably at a location prior to the inlet or suction side of the circulation pump of the water/ice system. When the cleaning solution is fed directly into the water sump, this is done preferably above the level of water held therein so that an air gap prevents water from the ice machine being siphoned or drawn back into the cleaning/sterilizing solutions.

Although the injection mechanisms depicted in the drawings are positive displacement pumps, other mechanisms are possible and are to be included within the meaning of the term "injection mechanism." For example, the storage vessels could be inverted, having a gravity flow to the water/ice system, and the cleaning/sterilizing flow controlled by a check valve, or possibly by the combination of a check valve and a venturi eductor located in the water/ice circulation lines.

The add-on cleaning/sterilizing system may be comfortably held within an apparatus case or container 59 which case 59 itself may have mounting slots 57, as in FIG. 4A and 4B, for easy mounting internally or externally (see FIG. 1) on the surfaces of the ice machine. In fact, wall surfaces external to the ice machine structures may be useful for mounting our cleaning/sterilizing system. (See FIG. 1B.) Similarly, the apparatus case may be mobile and brought to and connected with an ice machine equipped to accept the cleaning system contained therein.

Depicted also in FIG. 4A is a control board 58. In FIG. 5, the control board 58 is depicted in further detail. The control board 58 contains a relay 61, an LED light tube 62, a modular female connector 63, a cleaning frequency selector switch 64, and a momentary pump switch or priming switch 65. Also depicted in FIG. 4A is an electric power cord 67 and an electric line 66 to the dispensing pump 54. Each of these devices may be manually operated or, when connected to the ice machine, may be monitored and operated by the microprocessor and controlling/monitoring system.

THE CONTROLLING/MONITORING SYSTEM

Figure 6A:
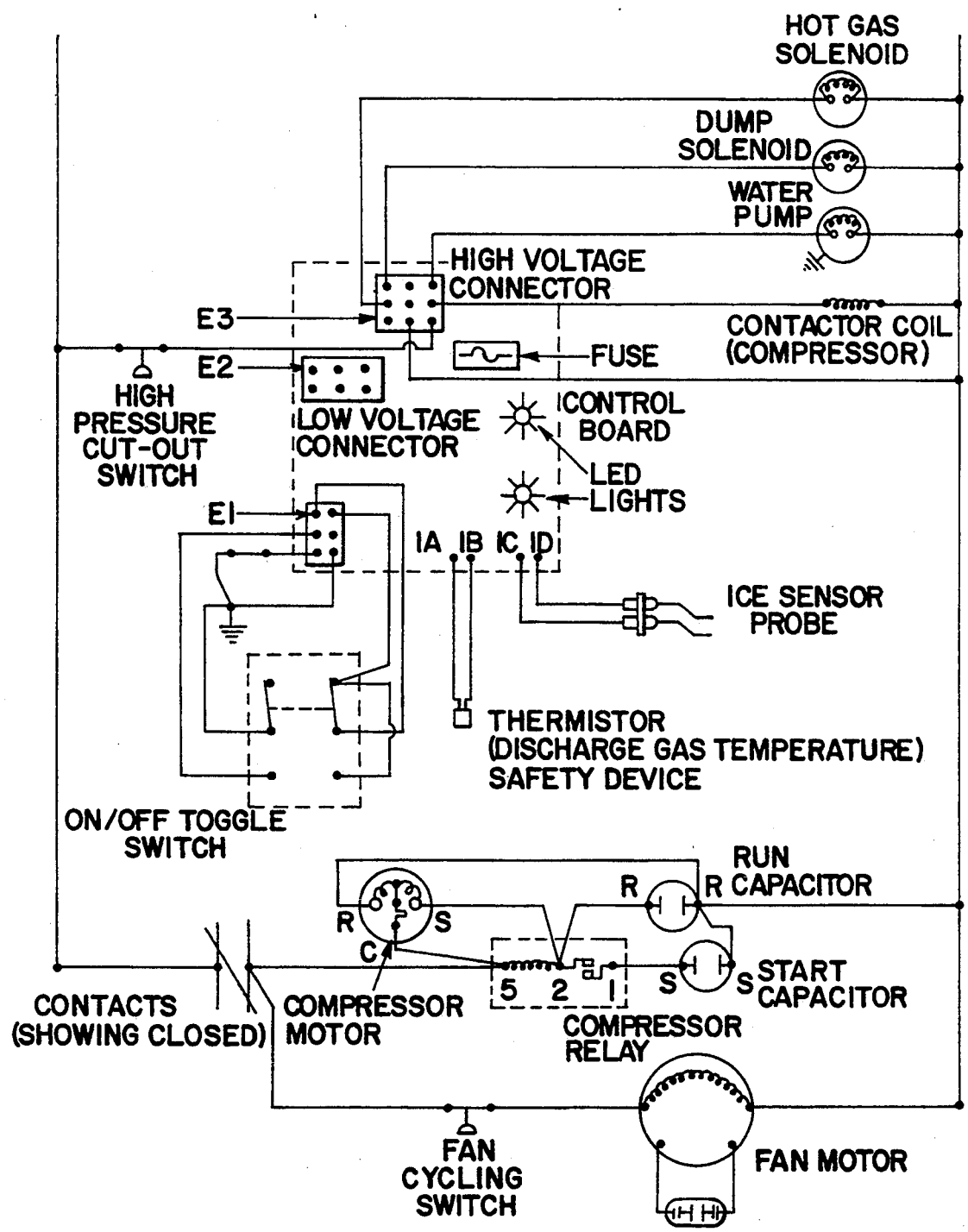
FIGS. 6A, 6B and 6C provide an outline of relevant portions of the electrical circuitry for the automatic ice machine of FIG. 1, including the cleaning/sterilizing systems and the controller.

The electronic controller for our preferred ice making machine comprises a programmable microprocessor capable of running routines and subroutines, which includes instructions. The microprocessor, using these instructions to monitor and program a sequence of events, thereby operates the ice making machine to achieve the advantages of the invention. FIGS. 6A, B and C illustrate certain embodiments of a portion of the circuitry used in connection with the programmable microprocessor and some of the operating circuitry of a preferred embodiment.

FIG. 6A provides a line schematic diagram of an ice machine of this invention. The diagram presents line indications for activating the hot gas solenoid 40 (used during the harvest cycle), the dump solenoid 9, the water pump 4, and the compressor (contactor coil) in a system abbreviated E3. This E3 system also appears on FIG. 6C.

The control board of the ice machine contains a high voltage connector, a low voltage connector, a fuse, LED lights, and leads to the ice thickness sensor probe and to a thermistor which monitors compressor gas discharge temperatures. If these temperatures are too high, the compressor is shut down. This is a safety/protection device for the coolant/refrigerant system.

System E1 and E2 are shown and will be explained. E1 is essentially the on/off toggle switch which enables function of the machine and provides power to the system.

Figure 6B:
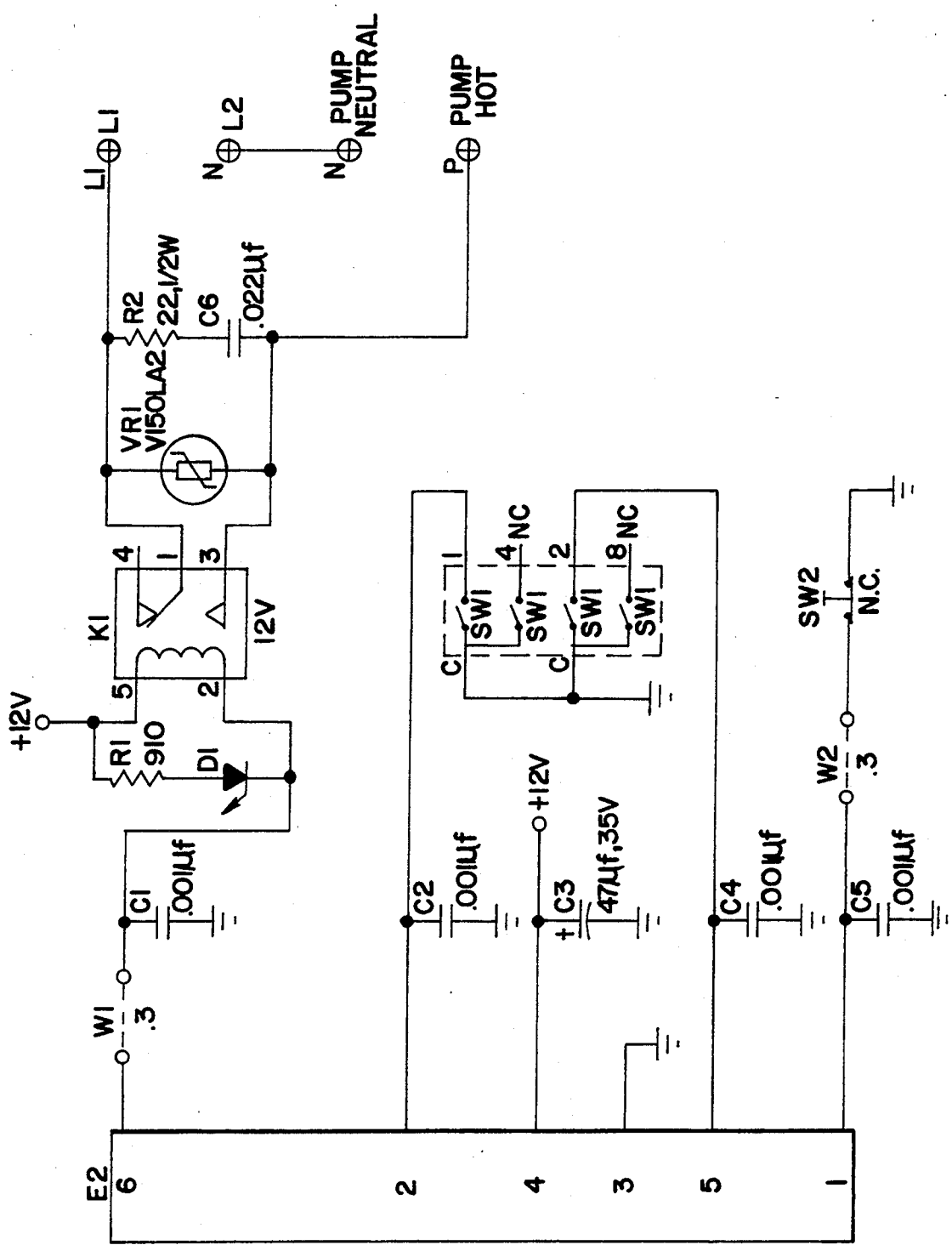

E2 is a contactor or connector plate accepting signals from the control board of FIG. 5, for which additional detail circuitry is provided in FIG. 6B.

Figure 6C:
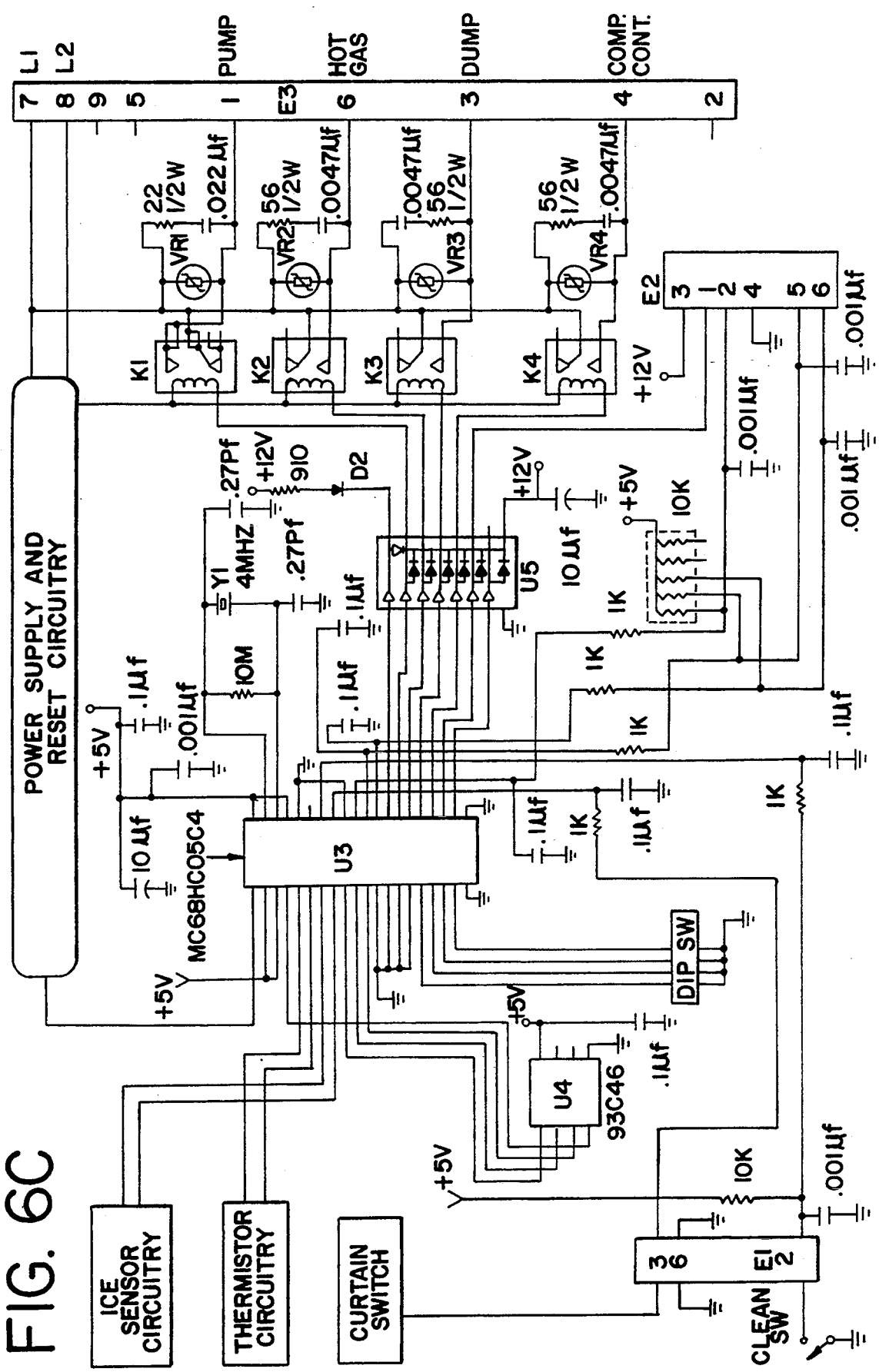

FIG. 6C provides additional circuit information relating to the microprocessor and its connection to the toggle switch E1, the self-cleaning add-on system contactor plate E2, and the contactor/connector system E3 operating within the ice machine itself. Each system displayed contains certain elements known to the artisan, such as resistors, variable resistors, capacitors, varistors, switches, relays, diodes, EE proms, microprocessors and chips, and the like.

The flow or logic routines may be written in any suitable programming language. In a preferred embodiment, for example, these logic flowchart embodiments are illustrated in FIGS. 7–16 and the source code embodiments are presented in the Appendix, attached hereto and made a part hereof. The Source Codes of the Appendix are written in a modified Motorola Assembly language. The routines may be compiled or otherwise modified, as appropriate, in order to run on any processor, or microprocessor, but the preferred processor is a Motorola MC68HCO5C4P. Also, this processor is preferably attached to an electrically erasable programmable, read only memory chip, referred to in FIG. 6C as 93C46. This chip provides additional data storage, failure mode prompts and storage, particularly ice harvest counting and count accumulation, and the like and provides access to this data to the microprocessor.

Other circuitry for the ice machine and, particularly, the cleaning/sterilizing system is illustrated in FIGS. 6A, 6B and 6C.

Figure 7:
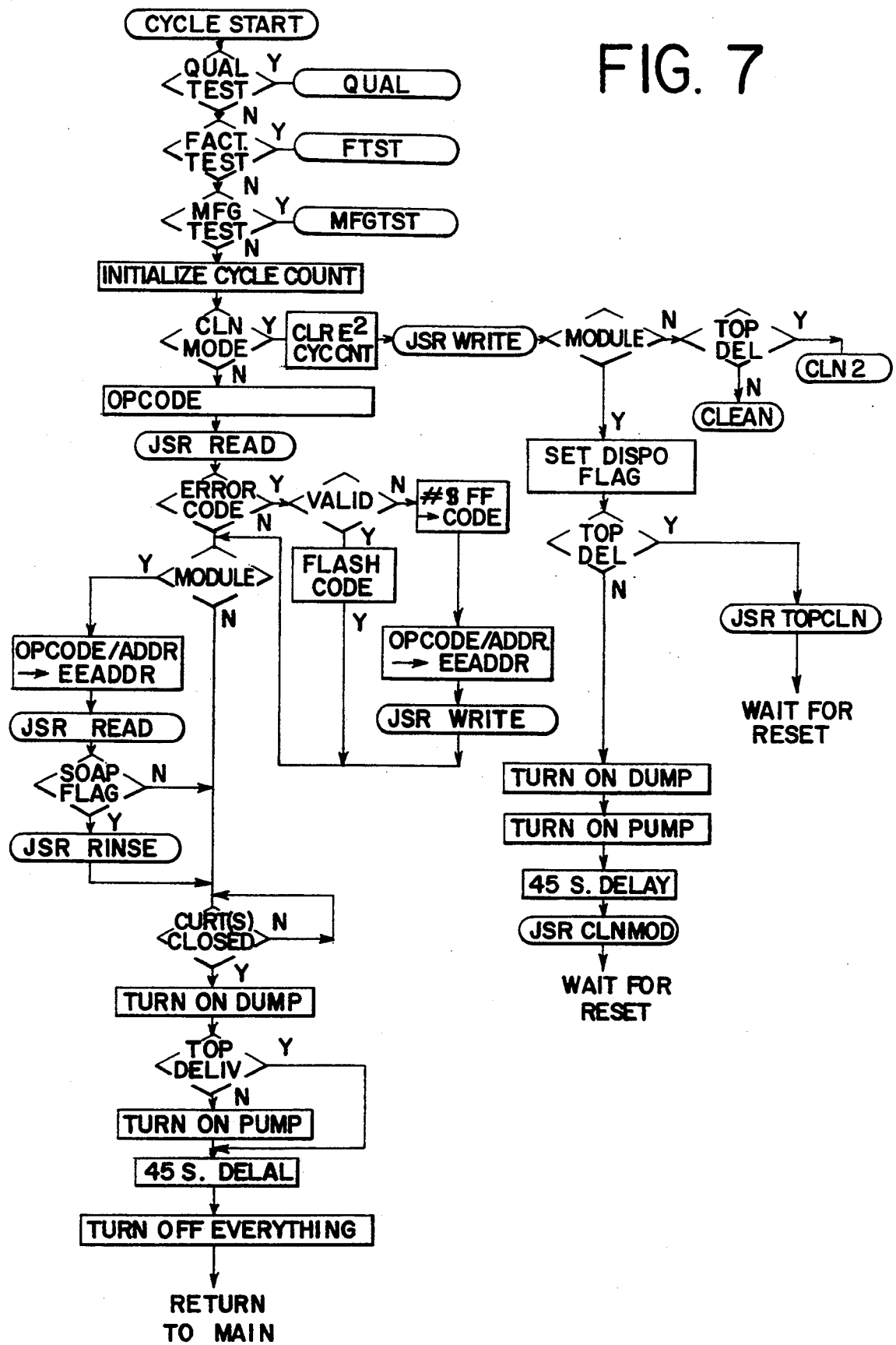
FIG. 7 is the flowchart of an embodiment of a routine for the microprocessor of FIG. 6C.
Figure 8:
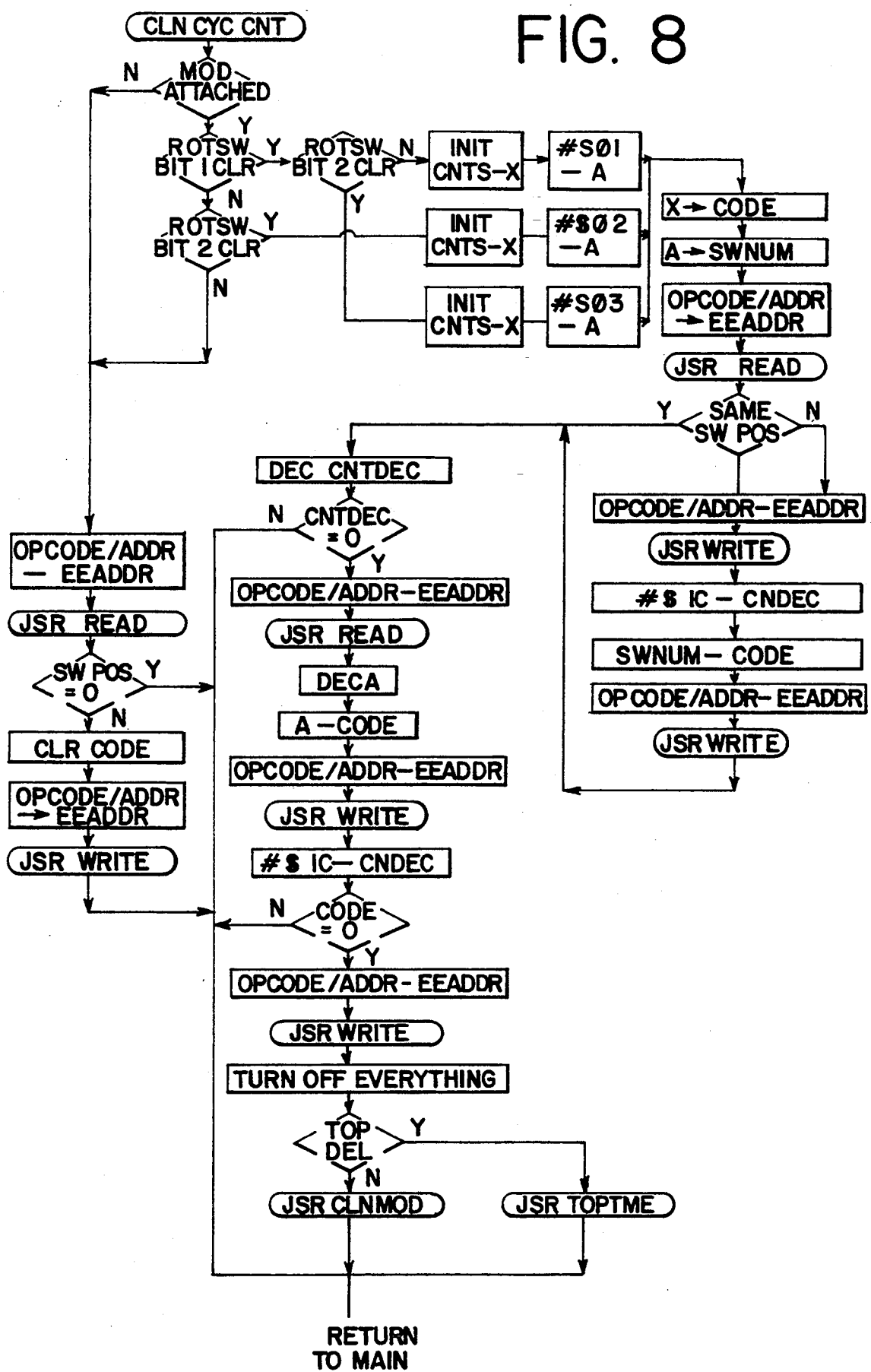
FIG. 8 is an embodiment for a flowchart for the CLN CYC CNT subroutine of FIG. 7.

FIG. 7 shows a general flowchart of the routine "CYCLE START." After power is switched on, initialization routines are run for factory hardware validation, and factory quality testing of system and components (See FIG. 7 and Appendix I). Thereafter, a "make ice" routine is provided when the machine begins operation. This begins the cycle counting/monitoring and the ice making and harvest of ice product as described above. The cycle count routine (CLN CYC CNT) is illustrated in FIG. 8. The other operating routines are illustrated in FIGS. 7 and 8, and the other remaining figures, and at least one choice of Motorola Assembly language for each such routine or subroutine appears respectively in the Appendix.

The machine operates primarily by first testing components of the system, and when these components are determined to be in working order, testing for the presence of the add-on cleaning/sterilizing system. If this system is not present, the machine is still capable of a cleaning cycle. The cleaning cycle includes, after shutdown of the coolant/refrigerant system, a dump of water accumulated in the water/ice system, the recharge and circulation of fresh water for a prescribed time period, during which a cleaner solution may be manually added, another dump of this first rinse, or manually added cleaning solution, followed by closing the dump valve, recharging fresh water, circulation of this next rinse water, and a repeat of this rinsing sequence for at least 3 times.

If the machine senses that the add-on cleaning/sterilizing system is present, the controller initiates operation of the cleaning solution injection and rinse cycles and/or the sterilizing solution injection and rinse cycles described above and below.

Figure 11:
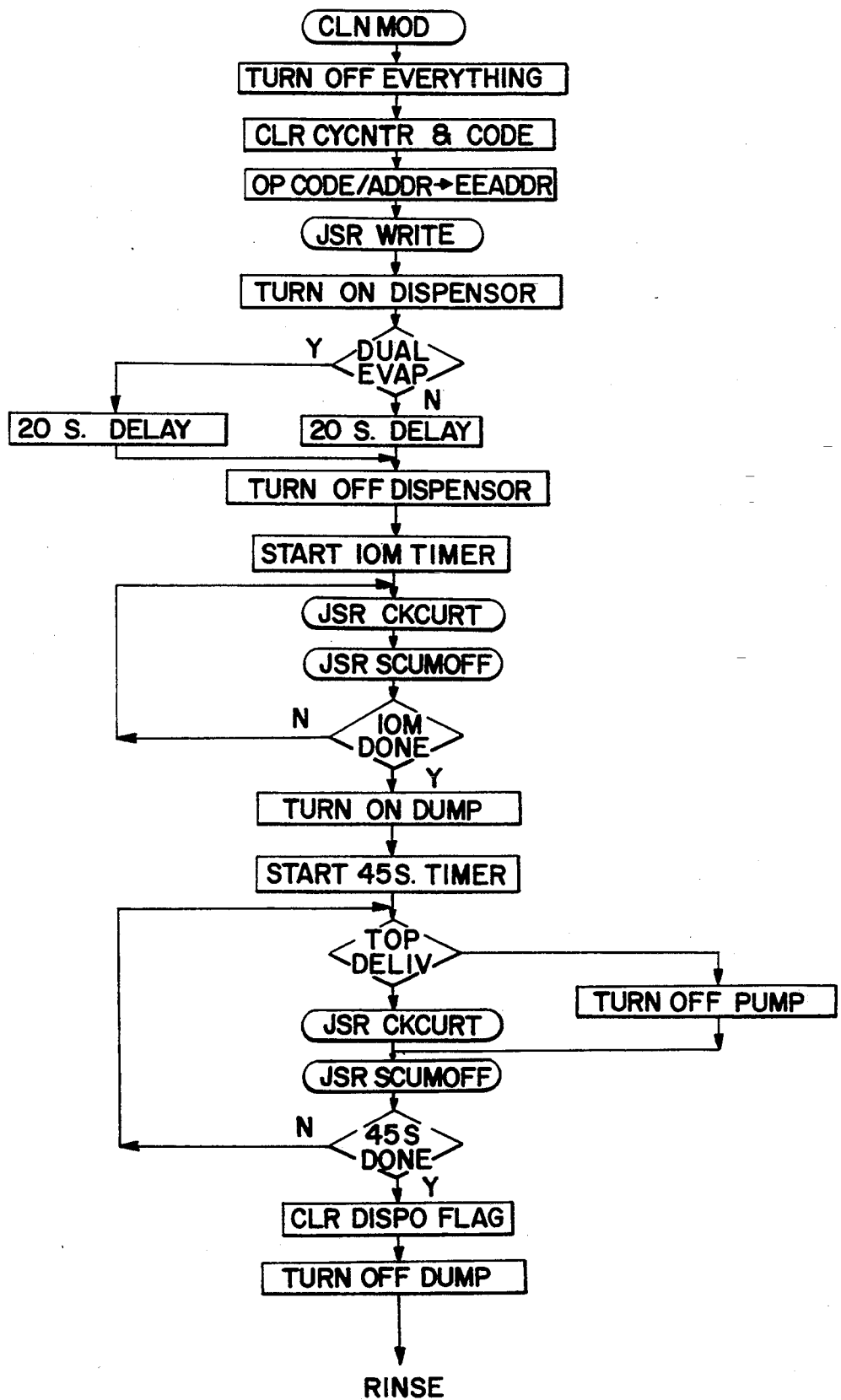
FIG. 11 is an embodiment for a flowchart for the CLNMOD subroutine of FIG. 7.

With or without the add-on system contained in case 59, the cleaning cycles can be manually initiated. Either on command, by the operator turning the switch on the control panel to "clean", or after a preset number of harvests, normally at least 100, have occurred, the cleaning mode, CLNMODE of FIG. 11, is activated. The cleaning mode "CLNMODE" runs automatic checks, illustrated in FIGS. 7 and 11, which determines the following:

1) proper harvest cycle count-verified;
2) presence of cleaner-if present, a preprogrammed series of rinses will follow;
3) automatic or manual dispensing of cleaning/sterilizing solution;
4) circulation of cleaning/sanitizing solution for prescribed time period;
5) dumping of cleaning/sterilizing solution from the water/ice system;
6) initiation of rinse cycles;
7) counting of rinse cycles;
8) termination of clean-rinse cycles;
9) initiation of ice making-harvesting; and
10) initiation of harvest cycle counting.

In the CLEAN subroutine (FIG. 9), the routine determines the state of the ON/OFF/CLEAN power main switch, and, if the switch is in the CLEAN position, immediately (or after the next harvest cycle if the machine is operating) initiates a clean routine.

In the SOAP FLAG sub-routine (FIG. 7), and if the main controller is not in the "CLEAN" position, the routine checks to make sure all cleaner has been rinsed from the system. The determination is made by monitoring the rinse cycles to determine if all programmed rinses have occurred. If not, a rinse sequence routine, RINSE, (FIG. 13) is started and completed before any further steps or operations occur.

The cleaner can be any safe and effective cleaner or cleaning solution. These cleaners or their solutions may contain acids and may or may not contain dispersants, detergents, soaps, chelating agents, neutralizing agents and the like. The appearance of the term "SOAP" in the logic routines or sub-routines does not indicate that a soap is necessarily present. Preferred cleaner acids are phosphoric acids in diluted forms, or partially neutralized diluted phosphoric acids.

The sterilizer or sterilizing solution can be any safe and effective sterilizer or sterilizing solution having sterilizing effectiveness against microbes, yeasts, algae, slimes or other microorganisms. These sterilizing agents may include fatty quaternary ammonium salts or other safe and effective microbicides.

Alternatively, the solution used may be a sterilizing solution containing available and acceptable biocides, slimicides or combinations thereof.

In FIG. 7, several sub-routines are not set forth in detail. These sub-routines are set forth in the later FIGS. 8–16, and suggestions for preferred corresponding language appears in the Appendix. The purposes and function of these routines and their Motorola Assembly language will be apparent to those skilled in the art.

FIG. 8 sets forth the so-called CLN CYC CNT sub-routine. In this routine, instructions are provided to allow the controller/microprocessor to do the following:

1) after a preset number of harvests have been completed, or after initiation of the cleaning/sterilizing cycle, the controller determines if an add-on module is present, contains cleaner, and is ready to operate. If so, the controller checks if it is time to initiate a clean cycle. If so, it initiates the clean cycle.
2) shuts down coolant/refrigerant system;
3) initiates and controls the clean cycle;
4) monitors ice machine type and varies clean/rinse instructions accordingly;
5) clears and completes the clean cycle and signals completion and readiness for ice-making start-up; and
6) turns off machine if problems occur, and signals the type of problem and the fact that a problem occurred.

FIGS. 9, 10, 11, 12, 13, 14, 15 and 16 provide detailed flowcharts for the sub-routines for operating the various cleaning steps listed.

Figure 9:
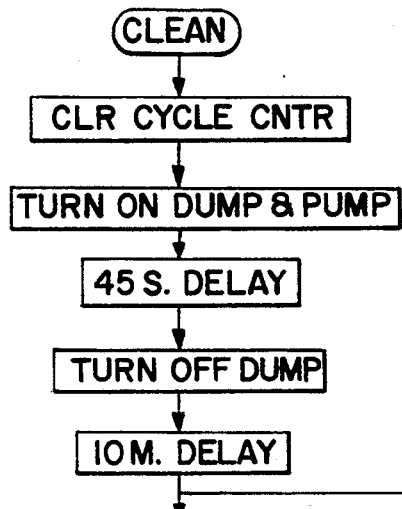
FIG. 9 is an embodiment for a flowchart for the CLEAN subroutine of FIG. 7.

FIG. 9 is the flowchart for the clean (CLEAN) sub-routine. This subroutine provides for:

1) initiation of a cleaning cycle when signaled by manual switch or automatic counter;
2) dumping of water in the sump by activating the dump solenoid valve for 45 seconds (in the preferred embodiment);
3) turn off dump by closing the dump solenoid valve;
4) recharge water/ice system with fresh water (programmed 10 minute delay in the preferred embodiment);
5) initiation of a clean cycle;
6) stopping the clean cycle;
7) initiation of a rinse cycle;
8) stopping;
9) repeat of rinse cycle; and
10) shut down/wait for reset or re-initiation-restart counter for harvest cycle.

FIG. 11 is a flowchart for the CLNMOD sub-routine of the routine of FIG. 7. This subroutine operates cleaning, as described above, for a dual evaporator ice machine system and an ice machine of the "Top Delivery" type. This "Top Delivery" machine is equipped with a water curtain and water curtain switch as earlier described. The subroutine operates the cleaning cycle, including dispensing cleaner, start-up of dilute cleaner solution circulation, shut down and dumping of dilute cleaner solution and signaling for rinse cycle start-up.

Figure 12:
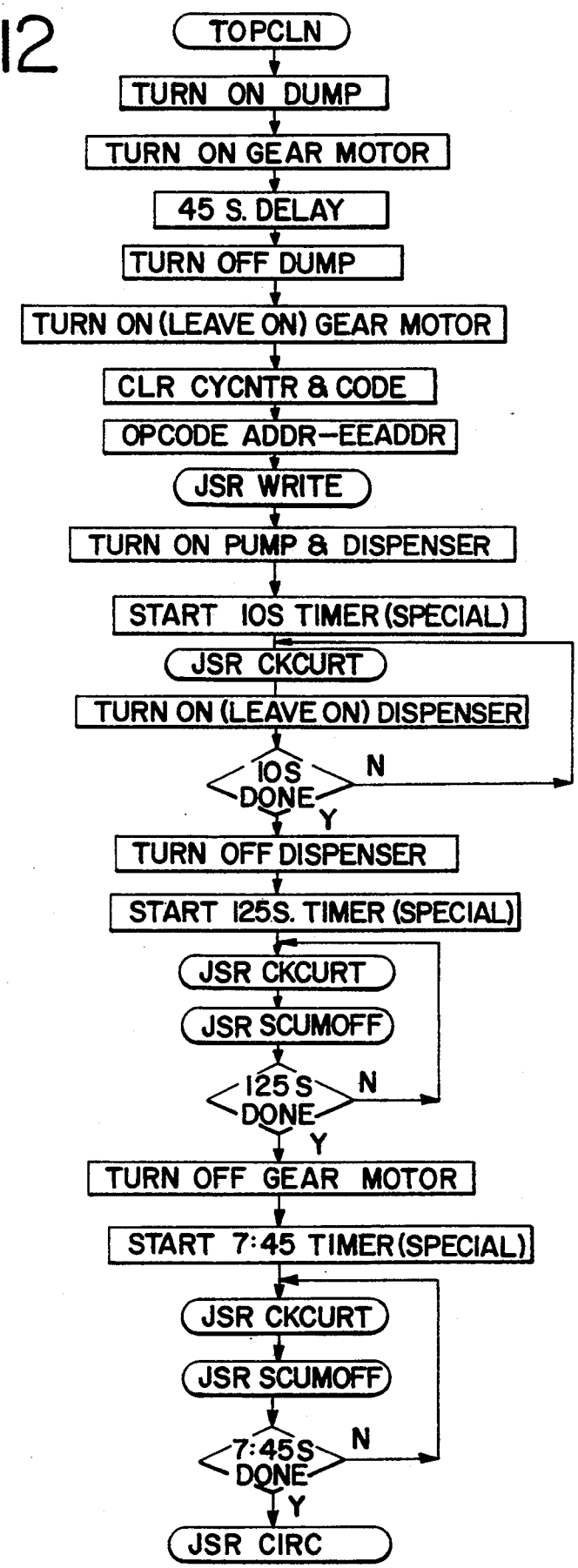
FIG. 12 is an embodiment for a flowchart for the TOPCLN subroutine of FIG. 7.

FIG. 12 is a preset flowchart for the TOPCLN sub-routine, designed specifically for the preferred ice makers of the invention.

Figure 13:
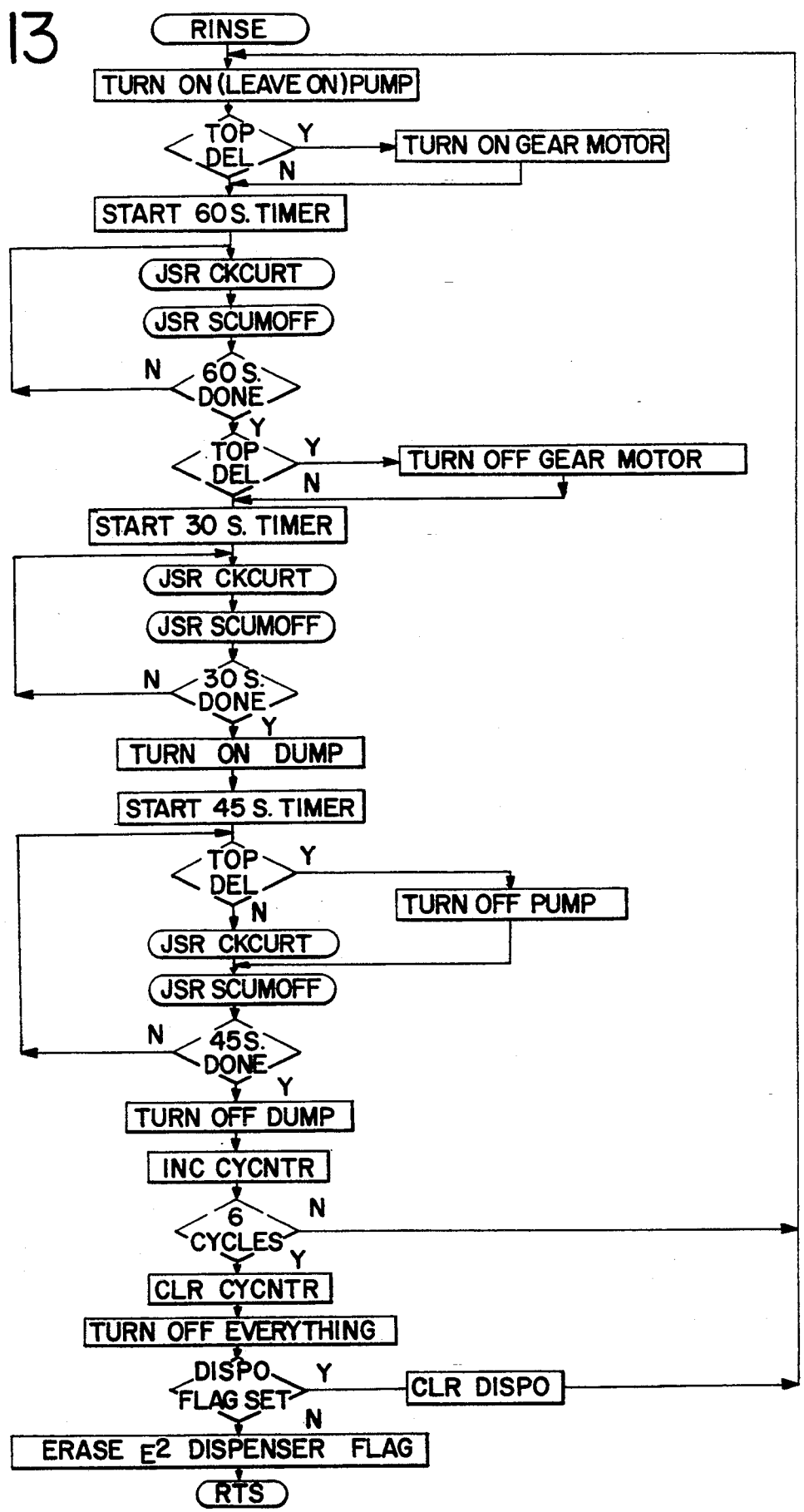
FIG. 13 is an embodiment for a flowchart for the RINSE subroutine of FIG. 7.

FIG. 13 is the flowchart for the RINSE sub-routine. Many of the operations described above are instructed by this sub-routine.

Figure 14A:
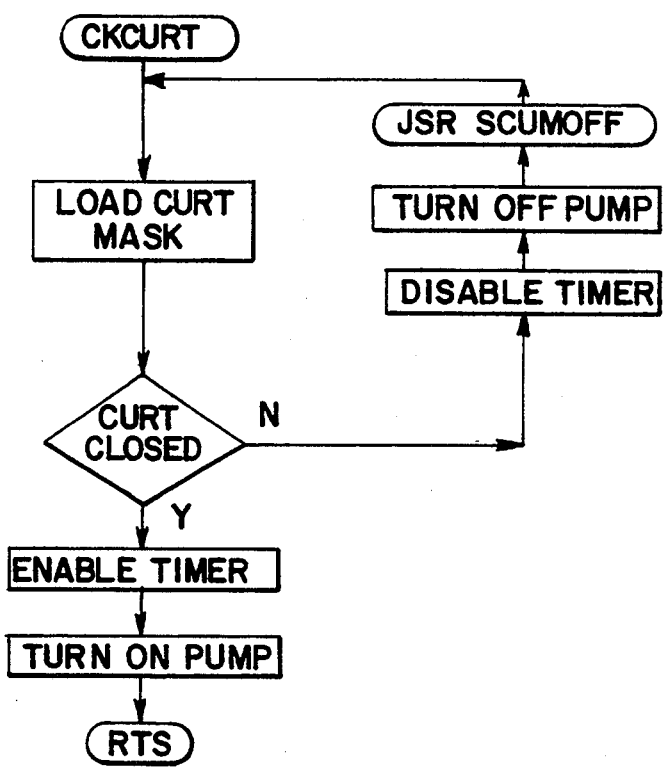
FIG. 14a is an embodiment for a flowchart for the CKCURT subroutine of FIG. 11.
Figure 14B:
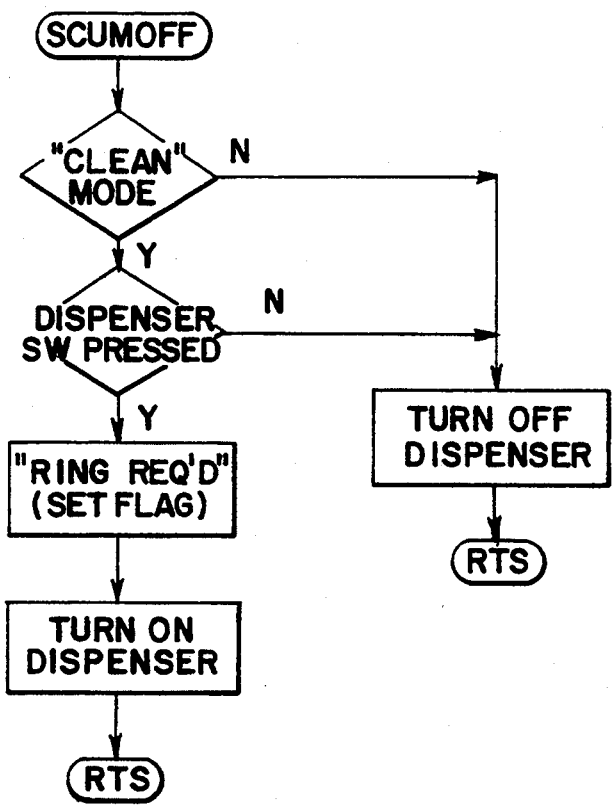
FIG. 14b is an embodiment for a flowchart for the SCUMOFF subroutine of FIG. 11.

FIGS. 14a and 14b are flowcharts for, (a) a subroutine CKCURT for water curtain monitoring and timing sequencing for the harvest cycle and for harvest counting, and (b) a sub-routine, SCUMOFF, used in FIG. 14a logic and FIG. 11 and FIG. 12 logic in the sequencing of CLNMODE and TOPCLN programs (FIGS. 11 and 12).

Figure 16:
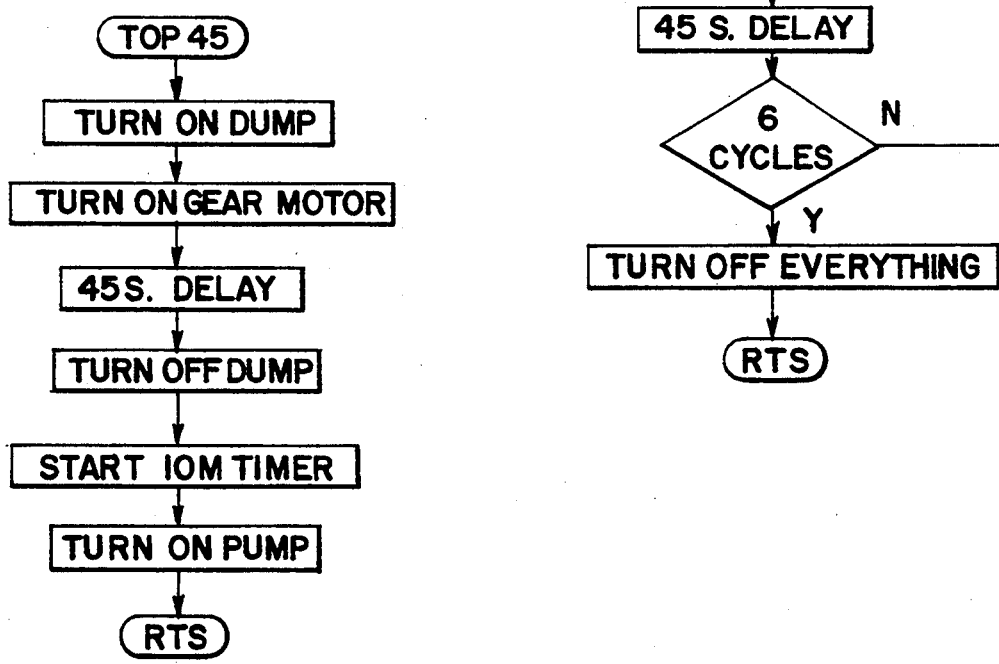
FIG. 16 is an embodiment for a flowchart for the TOP45 subroutine of FIG. 10.

FIG. 16 is a flowchart that provides a sub-routine for dump solenoid valve operation.

ALTERNATE/OPTIONAL ICE MAKING MACHINES

Figure 10:
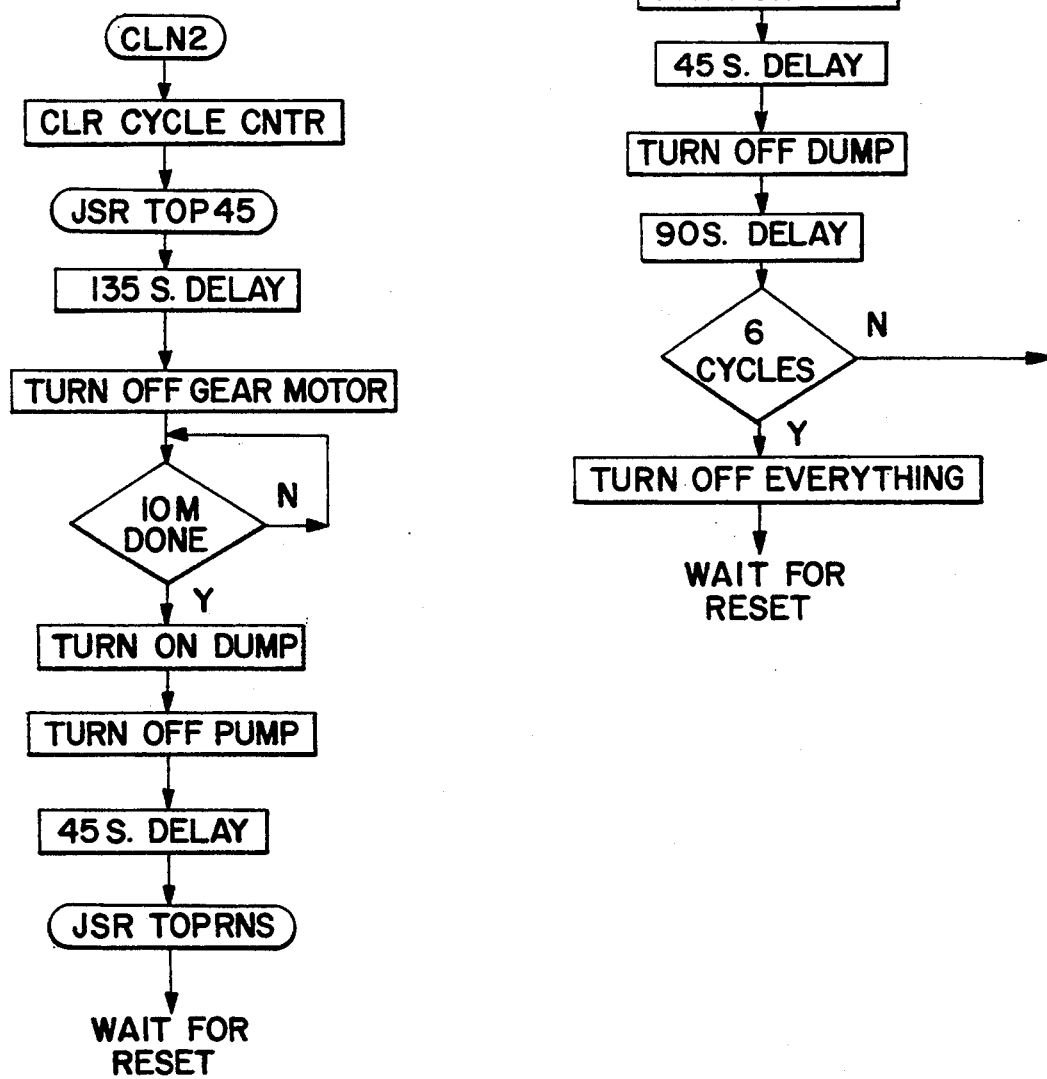
FIG. 10 is an embodiment for a flowchart for the CLN2 subroutine of FIG. 7.

FIG. 10 is a flowchart for the clean cycle for a particular type of ice machine equipped with a gear motor conveyor system for ice product harvesting.

Figure 15:
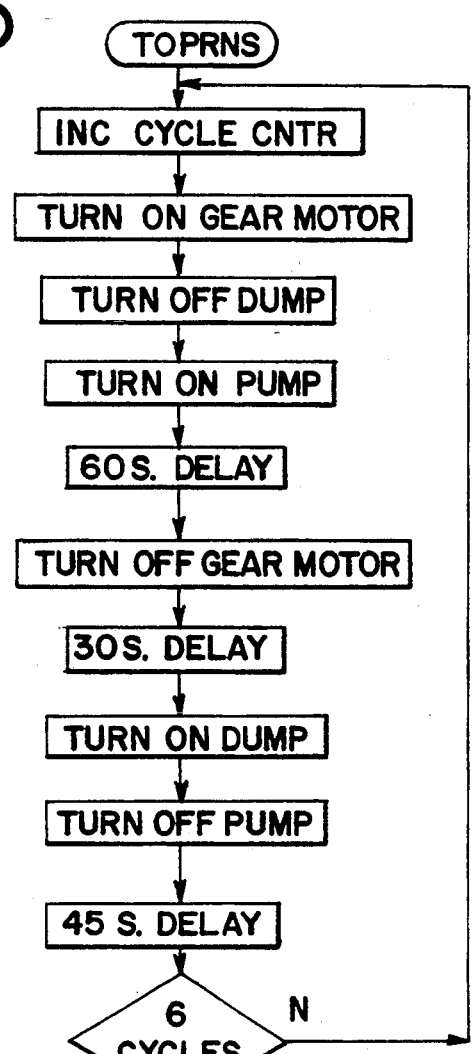
FIG. 15 is an embodiment for a flowchart for the TOPRNS subroutine of FIG. 10.

FIG. 15 is a flowchart for the routine for rinse cycles of ice machines having gear motor/conveyor system ice harvesting mechanisms. The subroutine permits cleaning conveyor system surfaces during the cleaning operation.

ACTUAL AND ALTERNATIVE OPERATIONS

The control panel 58 of the cleaning/sterilizing system may contain an optional on/off switch 69 which switch may have a third position entitled "clean" or "cleaning". When the switch is "off", the cleaning system is inactive, although the ice maker is functioning normally. When the switch is "on", the ice making 27 machine is operating and its operation is being monitored. The cleaning system is active and waiting for signals from the cleaning system controller to begin the cleaning cycles.

When the switch is manually placed in the "cleaning" mode, signals are sent to the ice making machine, which signals shut down both the freeze cycle circulation of coolant through the evaporator 12, and water flow through the circulation pump 4 to the distributor 7 and across the evaporator plate ice form 6 and into the water sump 3. After a short delay of from 2 to 10 seconds, preferably about 3–5 seconds, the solenoid dump valve 9 to the drain 10 is opened, and the water collected and accumulated in the water sump 3 is emptied to the drain. After at least 30 seconds, preferably about 40 to 50 seconds, and most preferably about 45 seconds, of open operation of this drain solenoid valve 9, the valve is automatically shut and water from the fresh water supply 1 is pumped into the water/ice system and is circulated therethrough for a period ranging from about 10 seconds to about 2 minutes, preferably about 30 seconds.

Thereafter, the injection pump 54 within the automatic self-cleaning/sterilizing system is activated, and the pump delivers a prescribed and preset amount of cleaning solution, or sterilizing solution, into the water-/ice circulating waters. This volume of cleaning or sterilizing solution is controlled by the injection pump or a combination of injection pump, alternate injector valves (not shown) and/or electronic valve controllers (not shown) working in sequence to provide such measurement.

Optionally, the connecting lines 50 or the injection lines 56 from the cleaning/sterilizing solution reservoir (or bottle) have installed therebetween a check valve which provides for flow in the direction towards the ice making water system and prevents back flow into the cleaning/sterilization solution storage reservoir bottle.

This back flow can also be prevented by properly mounting the add-on system in a manner to prevent any siphoning effect of water contained in the ice maker water system back to the bottles containing the cleaning and/or sterilization solutions, or by using the air gap installation when the injection line feeds directly into the sump, but above the water level therein, providing an air gap preventing backflow.

After the cleaning/sterilizing solution has been injected into the water/ice liquid recirculation system, the water circulation pump 4 of the ice machine water system continues to operate, thereby circulating water containing the now diluted cleaning solution throughout the system for a period ranging from about 3 minutes to about an hour, preferably for a period ranging from about 10 minutes to about 45 minutes, and most preferably for a period ranging between about 15 minutes and about 40 minutes, for example about 30 minutes. At the end of this timing sequence, a timer shuts down the water circulation pump 4 and opens the drain solenoid valve 9 providing for at least 30 seconds and up to a minute or more of draining time of the dilute cleaning solution contained in the water sump or water reservoir 3. After the drain time, preferably about 40-50 seconds, is completed, the solenoid dump valve 9 shuts and another timing sequence is started providing a fresh supply of water to the water system.

In this so-called "rinse" sequence, the water system of FIG. 2 fills with fresh water from the water supply, the water circulation pump 4 is started and fresh water is circulated through the system for a period ranging from about 2 minutes to about 20 minutes, preferably from about 5 minutes to about 15 minutes, and most preferably for about 10 minutes, thereby rinsing the surfaces of the water/ice system of cleaning/sterilizing solution. After this rinsing time is complete, an activating signal again opens the solenoid drain valve 9, shuts the circulation pump 4 and drains through drain 10 the first rinse water.

This so-called rinsing cycle is then automatically repeated from about 3 to about 6 times, preferably about 4-5 times, to insure complete rinsing of the cleaning solution, and the deposits and debris removed from the surfaces of the water/ice system.

Once the last of the preset rinse cycles has been completed, a signal is sent to the ice maker which initiates the next scheduled freeze cycle.

Alternatively, after the cleaning system has completed the last programmed rinse cycle as described above, in cleaning/sterilizing systems containing both cleaning and sterilizing solutions, a preset signal initiates the sterilizing solution injection pump 54 injecting sterilizing solution 52 into the water/ice system from the separate sterilizing solution storage reservoir 51. The sterilizing solution can be injected through a separate injection pump 54 or optional injection valve system (not shown), or optionally can be injected using the same injection pump/liquid line 56 as earlier described. It is preferable that if the sterilizing solution and the cleaning solution are stored in separate storage reservoirs, that each reservoir be equipped with a separate injection pump and delivery system with appropriate connector lines providing for a tie-in to the water/ice system as earlier described.

When the sterilizing solution system is activated, again the sterilization solution 52 is added in known volume and concentration to the water/ice system through a tie-in into this recirculating water system of FIG. 2. The same sequence as described above for the cleaning cycle is followed in the sterilizing cycle. The sterilization solution attacks, kills and removes bacterial growth, slimes and the like from surfaces in contact with circulating water or ice in the water/ice systems described above. Circulation of sterilizing solution within the water/ice system is again controlled, as above, for time periods of from five minutes to about one hour, preferably about fifteen minutes to about forty-five minutes, and most preferably from about twenty to thirty minutes. After the sterilization solution has been circulated for a prescribed and pre-set period of time, a sequence timer signals the drain solenoid valve 9 to open and the circulation pump 4 to shut down, thereby draining the sterilizing solution to the drain 10.

After a drain time ranging from about 20 seconds to about a minute, preferably for about 30 seconds to about 50 seconds, the drain solenoid valve 9 is closed and fresh water is supplied to the water sump or reservoir 3. The circulation pump 4 is started and this fresh water recirculated for the rinsing times described above. The rinse cycle is repeated automatically for that period and number of times needed to remove the sterilizing solution components from the water/ice system. The number of times the rinse cycle is repeated may be chosen by the operator, but normally the rinsing cycle is repeated automatically from between 4-6 times. This insures removal of the sterilizing solution from the water/ice system.

Finally, after the completion of the last rinse cycle, a signal is sent with the last closing of the solenoid drain valve 9 draining the last rinse, which signal initiates the automatic ice-making machine freeze cycle, beginning the freeze/harvest operation of the ice machine, temporarily shutting down the cleaning/sterilizing system until next commanded to operate.

In certain of the above descriptions, the cleaning solution and the sterilizing solution are preferably contained in separate reservoirs and both are interconnected to the same, or a different, water line of the water/ice system. The water line interconnection is preferably prior to the suction side of the circulation pump in the water/ice system of the ice maker. This provides for separate charges of the cleaning solutions and the sterilizing solutions at separate times, followed by separate rinse cycles and sequencing of rinse cycles to assure proper cleaning and removal of the cleaning solution and/or the sterilizing solution.

The automatic ice making machine may preferably contain sequence timers and controllers which may be initiated manually or automatically. As a further, but unlimiting example, a switch can be installed on the ice maker or separately installed on the cleaning/sterilizing system, which switch can be manually placed in a "clean" cycle. When so placed, the ice machine immediately receives instructions to shut down and, thereafter, initiates the cleaning cycles and/or the sterilizing cycles above described. This permits an operator to shut down the ice making operation of the machine, load cleaning/sterilizing solution, and initiate the self-cleaning/self-sterilizing automatic system described.

Alternatively, an electronic counter is installed which receives a signal from the water curtain switch each time the water curtain indicates a harvest cycle is complete. The counter can be preset to initiate a cleaning cycle after a prescribed number of harvest cycles have been completed.

For example, if a harvest timer/counter is preset at 100 harvest cycles, after the completion of 100 counts indicating a harvest cycle has been completed, a signal would be sent automatically to the cleaning system which would begin the cleaning and/or sterilizing cycles described above.

In this example, the counter is reactivated, that is set back to zero counts, so that the cleaning cycle can again begin after the next 100 harvest cycles.

This automatic sequence counter for the cleaning system cycle can be set at 100, 500, or 1,000 harvest counts, 10,000 harvest counts, 20,000 harvest counts, 50,000 harvest counts, and the like. This preset counter number will be selected by the operator, and can depend upon the severity of the water and/or environmental conditions leading to the deposit formations which are being cleaned and sanitized. This counting system is automatically provided for in the equipment described above and can be interrupted by manually switching to the cleaning mode as described above.

Other Alternatives

Automatic ice making machines of various designs may function with our invention and the descriptions above are not to be limiting.

In addition to the flowcharts for the sub-routines described in FIGS. 7-16, inclusive, certain preferred algorithms or instructions for each are presented separately in the Appendix. Again, these algorithms or instructions are but embodiments of the control instructions possible in operating our machine. They are not to indicate any limitation to the invention, since other routines, subroutines, instructions, 33 algorithms and/or languages may be used to achieve the machine and the operation thereof of this invention.

Similarly, other mechanical arrangements and devices, other electronic arrangement and devices, other microprocessors and other logic routines and subroutines would be possible and are to be included in the invention. The drawings, including the drawings of the routines or subroutines above, are not meant to limit the scope of the invention, but only to demonstrate preferred embodiments at the present time.

APPENDIX

Algorithms (Instructions) for the Routines (Subroutines) for an Automatic Self-Cleaning/Self-Sterilizing Ice Maker

|  |  | Page |
|---|---|---|
| Appendix I | Program Listing for the Routine of FIG. 7 | 42 |
| Appendix II | Program Listing for the Routine of FIG. 8 | 45 |
| Appendix III | Program Listing for the Routine of FIG. 9 | 47 |
| Appendix IV | Program Listing for the Routine of FIG. 10 | 48 |
| Appendix V | Program Listing for the Routine of FIG. 11 | 49 |
| Appendix VI | Program Listing for the Routine of FIG. 12 | 50 |
| Appendix VII | Program Listing for the Routine of FIG. 13 | 52 |
| Appendix VIII | Program Listing for the Routine of FIG. 14a | 54 |
| Appendix IX | Program Listing for the Routine of FIG. 14b | 55 |
| Appendix X | Program Listing for the Routine of FIG. 15 | 56 |
| Appendix XI | Program Listing for the Routine of FIG. 16 | 57 |

APPENDIX I. Program Listing for the Routine of Figure 7.

```
INQUAL  LDA #$F0       *MASK OFF THE FOUR LOWER BITS
        STA MASK
        JSR READPB     *AND READ THE DIPSWITCHES

LDA TEMP4      *SEE IF WE'RE IN THE QUAL TEST MODE
        CMP #$60
        BNE CHKTST     *IF NOT IN QUAL MODE, CHECK FACTORY TEST
        JMP QUAL       *WE'RE IN THE QUAL MODE SO LET'S TEST IT

CHKTST  TST TEMP4      *READ THE DIPSWITCH SETTINGS
        BNE CHKMFG     *BRA IF DON'T WANT THE FACTORY TEST
        JMP FTEST      *GO DO THE FACTORY TEST SEQUENCE

CHKMFG  LDA TEMP4      *SEE IF WE'RE IN THE MFG. TEST MODE
        CMP #$F0
        BNE CHKCLN     *BRA IF NOT IN MANUFACTURING TEST MODE
        JMP MFGTST     *LET'S GO DO SOME MANUFACTURING TESTING

LDA #$1C       *WE NEED 28 COUNT CYCLES AT RESET
        STA CNTDEC     *USED IN THE AUTO-CLEAN CYCLE COUNT

BSET 4,PORTA   *NO VOLTAGE ON ICE SENSOR YET

*CHECK TO SEE IF THE ICE MACHINE IS IN THE CLEAN MODE
CHKCLN  LDA #$20       *MASK DATA FOR UNUSED BITS
        STA MASK
        JSR READPD     *ARE WE IN THE 'CLEAN' MODE ?

BRSET 5,TEMP4,NORM  *BRA IF NOT IN 'CLEAN'
```

```
        CLR CODE        *WE WANT TO RESET THE CYCLE COUNT
        LDA #$4C        *SO WE'LL CLEAR THE SWITCH POSITION
        STA EEADDR      *THAT'S STORED IN THE EEPROM
        JSR WRITE

LDA #$01        *LOOK AT PORT D0
        STA MASK        *MASK UNUSED BITS
        JSR READPD      *AND SEE IF THE MODULE IS ATTACHED

TST TEMP4
        BEQ MODCLN      *IF ATTACHED, DO MODULE CLEAN ROUTINE

BRSET 0,IDENT,WECLN *BRA IF TOP DELIV

JMP CLEAN       *REGULAR CLEAN MODE' FOR (SGL/DUAL)

WECLN   JMP CLN2        *USE A DIFFERENT CLEAN ROUTINE FOR TOP DELIV

MODCLN  BSET 0,DISPO    *SET FLAG (ACTIVATE DISPENSER W/SWITCH)

BRSET 0,IDENT,NOPUMP *BRA IF TOP DEL, DIFFERENT DRAIN CYCLE

BSET 3,PORTC    *TURN ON THE DUMP SOLENOID
        BSET 1,PORTC    *TURN ON THE PUMP SOLENOID

LDA #$2D        *WE WANT A 45 SECOND DELAY

JSR DSEC

JSR CLNMOD      *AND GO DO SOME CLEANING

HOLDIT  BRA HOLDIT      *NOW WAIT FOR RESET

NOPUMP  JSR TOPCLN      *GO DO THE TOP DELIVERY CLEAN ROUTINE

WHOA    BRA WHOA        *AND WAIT FOR RESET

*NOW WE'RE READY TO DISPLAY THE ERROR CODE, IF THERE IS ONE
NORM    LDA #$80        *'READ' OPCODE FOR ADDR $00
        STA EEADDR      *STORE IT FOR THE EEPROM ROUTINE
        JSR READ        *GET STORED ERROR CODE
        STA CODE
        CMP #$FF        *IS EEPROM BLANK - NO ERRORS ?
        BEQ CKSOAP      *IF SO, DON'T DISPLAY IT

CMP #$05        *IS THE ERROR CODE VALID ? (4 ERRORS ?)
        BCS DISPIT      *IF SO, BRA TO DISPLAY IT

LDA #$FF        *IF NOT, ERASE THE EEPROM
        STA CODE        *STORE THE ERASE DATA
        LDA #$40        *'WRITE' OPCODE FOR ADDR $00
        STA EEADDR
        JSR WRITE
        BRA CKSOAP

DISPIT  JSR ERROROK     *GO DISPLAY THE ERROR

*WE NEED TO SEE IF THERE MIGHT BE ANY CLEANING FLUID IN THE SYSTEM
CKSOAP  LDA #$01        *LOOK AT PORT D0
        STA MASK        *MASK OFF THE UNUSED BITS
        JSR READPD      *GO READ THE PORT
```

```
        BRSET 0,TEMP4,CURT  *NO CLEAN MODULE ATTACHED, DON'T DO A RINSE

LDA #$8A        *'READ' OPCODE FOR ADDR $0A
    STA EEADDR      *LET'S SEE IF THE DISP/CLEANER WAS INTERRUPTED
    JSR READ        *GET STORED DISPENSER CODE

BNE CURT        *BRA IF EEPROM LOCATION IS NOT = 00

JSR RINSE       *DISP/CLEANER WAS INTERRUPTED, GO RINSE !

*EVERYTHING ELSE IS DONE, NOW WE'RE READY TO MAKE ICE !!!
CURT    BRSET 1,IDENT,CKIT2 *MONITOR BOTH CURTAINS IF DUAL EVAP

LDA #$10        *MASK ALL BUT THE SGL EVAP CURTAIN
    BRA UMASK

CKIT2  LDA #$18     *DUAL EVAP, DON'T MASK EITHER CURTAIN
UMASK  STA MASK
    JSR READPD      *READ THE PORT DATA

TST TEMP4       *THIS IS THE 'DEBOUNCED' PORT DATA
    BNE CURT        *BRA IF CURTAIN IS OPEN - MUST BE FULL OF ICE

CONT   BSET 3,PORTC    *TURN ON THE DUMP SOLENOID

BRSET 0,IDENT,SKIP1 *WE DON'T WANT THE PUMP ON FOR TOP DELIVERY

BSET 1,PORTC    *TURN ON THE PUMP SOLENOID

SKIP1  LDA #$2D     *SET UP FOR A 45s DELAY
    JSR DSEC

CLR PORTC       *TURN EVERYTHING OFF
```

APPENDIX II.  Program Listing for the Routine of Figure 8.

```
********************************************************
******** CYCLE COUNTING ROUTINE FOR THE CLEAN MODULE ********
CLCNT  LDA #$01     *LOOK AT PORT D0
    STA MASK        *MASK THE UNUSED BITS
    JSR READPD      *GO READ THE PORT

BRSET 0,TEMP4,NOMOD *BRA IF THERE IS NO MODULE

LDA #$06        *LOOK AT PORT D1, D2
    STA MASK        *MASK THE UNUSED BITS
    JSR READPD      *GO READ THE PORT

BRCLR 1,TEMP4,TSTB2 *BRA IF THE FIRST SW BIT IS CLEAR
    BRCLR 2,TEMP4,SWNO2 *BRA IF 1ST BIT SET, 2nd BIT CLR - SW#2

NOMOD  LDA #$8C
    STA EEADDR      *SEE IF WE HAVE ALREADY CLEARED THE SW POSITION
    JSR READ

BEQ DUNCLN      *IF SO, JUST CONTINUE

CLR CODE        *IF NOT, LET'S GO CLEAR IT
    LDA #$4C        *CLEAR THE DATA (SWITCH POSITION)
    STA EEADDR      *WE WILL WANT TO LOAD NEW INITIAL COUNTS
```

```
        JSR WRITE
        BRA DUNCLN

TSTB2   BRCLR 2,TEMP4,SWNO3  *BRA IF 2nd BIT ALSO CLEAR - SW#3

SWNO1   LDX #$28     *LOAD INITIAL CYCLE COUNT (40x28)
        LDA #$01     *LOAD SWITCH SELECTION NUMBER
        BRA CNTCLR

SWNO2   LDX #$50     *LOAD INITIAL CYCLE COUNT (80x28)
        LDA #$02     *LOAD SWITCH SELECTION NUMBER
        BRA CNTCLR

SWNO3   LDX #$F0     *LOAD INITIAL CYCLE COUNT (240x28)
        LDA #$03     *LOAD SWITCH SELECTION NUMBER

CNTCLR  STX CODE     *SAVE THE INITIAL COUNT
        STA SWNUM    *AND SAVE THE SWITCH NUMBER (POSITION)

LDA #$8C     *GO READ THE LAST STORED SW POSITION
        STA EEADDR
        JSR READ

CMP SWNUM    *IS IT THE SAME SWITCH AS LAST TIME ?
        BEQ DECIT    *BRA IF IT IS THE SAME

LDA #$4B     *IT'S A DIFFERENT SELECTION
        STA EEADDR   *SO SAVE THE INITIAL COUNT
        JSR WRITE

LDA #$1C     *GET READY FOR THE COUNT MULTIPLIER (28)
        STA CNTDEC   *AND STORE IT

LDA SWNUM    *NOW PREPARE TO SAVE THE SWITCH POSITION
        STA CODE

LDA #$4C     *STORE THE SELECTION (SWITCH POSITION)
        STA EEADDR
        JSR WRITE    *SAVE THE SWITCH SELECTION

DECIT   DEC CNTDEC   *DECREMENT A CYCLE COUNT
        BNE DUNCLN   *BRA IF NOT ZERO YET

LDA #$8B     *GET THE NUMBER OF STORED CYCLE COUNTS
        STA EEADDR
        JSR READ

DECA         *AND DECREMENT THE NUMBER OF CYCLES
        STA CODE     *STORE IT FOR THE EEPROM ROUTINE
        LDA #$4B     *PREPARE TO WRITE TO THE EEPROM
        STA EEADDR
        JSR WRITE    *GO WRITE THE NUMBER OF CYCLES LEFT

LDA #$1C     *LOAD MORE CYCLE COUNTS TO DECREMENT
        STA CNTDEC

TST CODE
        BNE DUNCLN   *BRA IF WE AREN'T READY TO CLEAN

LDA #$4C     *CLEAR THE DATA (SWITCH POSITION)
        STA EEADDR   *WE WILL WANT TO LOAD NEW INITIAL COUNTS
        JSR WRITE
```

```
    CLR PORTC        *TURN OFF EVERYTHING

BRSET 0,IDENT,ONTOP *DIFFERENT CLEAN ROUTINE FOR TOP DELIV

JSR CLNMOD       *LET'S GO CLEAN THE MACHINE
    BRA DUNCLN       *NOW MAKE MORE ICE

ONTOP  JSR TOPTME    *GO DO THE TOP DELIVERY AUTO-CLEAN
DUNCLN JMP FREEZE    *AND GO MAKE SOME MORE ICE
```

APPENDIX III.  Program Listing for the Routine of Figure 9

```
**************** CLEAN ROUTINE - SINGLE EVAP ****************
CLEAN   CLR CYCNTR       *CLEAR THE CYCLE COUNTER

BSET 3,PORTC     *TURN ON THE DUMP SOLENOID
        BSET 1,PORTC     *TURN ON THE PUMP SOLENOID

LDA #$2D         *RUN FOR 45 SEC
        JSR DSEC

BCLR 3,PORTC     *TURN OFF THE DUMP SOLENOID

LDA #$0A         *RUN FOR 10 MINUTES
        JSR DMIN

GLEAM   INC CYCNTR       *COUNT THE CYCLES

BSET 3,PORTC     *TURN ON THE DUMP SOLENOID
        LDA #$2D         *RUN FOR 45 SEC
        JSR DSEC

BCLR 3,PORTC     *TURN OFF THE DUMP SOLENOID
        LDA #$5A         *RUN FOR 90 SEC
        JSR DSEC

LDA #$06         *CHECK THE NUMBER OF CYCLES
        CMP CYCNTR       *HAVE WE CYCLED 6 TIMES ?
        BNE GLEAM        *IF NOT DONE, GO BACK AND CLEAN MORE

CLR PORTC        *TURN OFF EVERYTHING

FINI    BRA FINI         *WE'RE DONE, NOW WE JUST WAIT
```

APPENDIX IV.  Program Listing for the Routine of Figure 10

```
**************** CLEAN ROUTINE - TOP DELIVERY ****************
CLN2    CLR CYCNTR       *CLEAR THE CYCLE COUNTER

JSR TOP45        *45 SEC DUMP CYCLE

LDA #$87         *PREPARE TO RUN FOR 135 SEC (2:15)
        JSR DSEC         *AND WAIT FOR THE DELAY

BCLR 6,PORTC     *TURN OFF THE GEAR MOTOR
```

```
CLNTME  TST TIME3      *IS MINUTE TIMER DONE ?
        BNE CLNTME     *IF NOT, LOOP AND LOOK AGAIN

BSET 3,PORTC   *TURN ON THE DUMP SOLENOID
        BCLR 1,PORTC   *TURN OFF THE PUMP SOLENOID

LDA #$2D       *PREPARE TO RUN FOR 45 SEC
        JSR DSEC       *AND WAIT FOR THE DELAY

JSR TOPRNS     *NOW GO RINSE

WEWAIT  BRA WEWAIT     *WE'RE DONE, NOW WE JUST WAIT
```

APPENDIX V. Program Listing for the Routine of Figure 11

```
**** SUBROUTINE TO CLEAN/SANITIZE USING THE CLEANING MODULE ****
CLNMOD  CLR PORTC      *TURN OFF EVERYTHING
        CLR CYCNTR     *CLEAR THE CYCLE COUNTER

CLR CODE       *CLR EEPROM TO INDICATE DISPENSER ACTIVITY
        LDA #$4A       *WRITE OPCODE FOR EEPROM LOCATION $0A
        STA EEADDR
        JSR WRITE      *AND GO WRITE TO THE EEPROM

BSET 5,PORTC   *TURN ON THE DISPENSER

BRCLR 1,IDENT,SGL10 *FOR THE SGL EVAP WE WANT TO DISP ONLY 10 SEC
        LDA #$14       *FOR THE DUAL, DISP FOR 20 SECONDS
        BRA DSPTM

SGL10   LDA #$0A       *LEAVE THE DISPENSER ON FOR 10 SECONDS
DSPTM   JSR DSEC

BCLR 5,PORTC   *TURN OFF THE DISPENSER

CLR CNTD       *PREPARE TO USE THE SPECIAL MINUTE TIMER
        CLR TIME6      *THIS TIMER CAN BE PREVENTED FROM COUNTING
        CLR ONESEC     *BY ADDING A "0" (ADD "1" & THE TIMER COUNTS)

LDA #$0A       *START THE TIMER
        STA TIME7      *WITH 10 MINUTES

CIRC    JSR CKCURT     *CHECK THE CURTAIN SWITCH
        JSR SCUMOFF

TST TIME7      *IS THE MINUTE TIMER DONE ?
        BNE CIRC

BSET 3,PORTC   *TURN ON THE DUMP

CLR CNTD       *START THE 45s TIMER
        LDA #$2D
        STA TIME6

GO45S   BRSET 0,IDENT,TDOFF *DON'T WANT PUMP ON IF TOP DELIV

JSR CKCURT     *CHECK THE CURTAIN SW
        BRA SGLON      *WANT TO LEAVE THE PUMP ON IF SGL EVAP

TDOFF   BCLR 1,PORTC   *TURN OFF THE PUMP IF TOP DELIV
```

```
SGLON  JSR SCUMOFF

TST TIME6      *IS THE 45s TIMER DONE ?
       BNE GO45S

BCLR 1,DISPO   *NO EXTRA RINSE, WILL DO FULL RINSE ANYWAY
       BCLR 3,PORTC   *TURN OFF THE DUMP
```

APPENDIX VI.  Program Listing for the Routine of Figure 12

```
****************************************************
**** CLEAN/SANITIZE (TOP DELIVERY) WITH THE CLEANING MODULE ****
TOPCLN BSET 3,PORTC   *TURN ON THE DUMP SOLENOID
       BSET 6,PORTC   *TURN ON THE GEAR MOTOR

LDA #$2D       *PREPARE TO RUN FOR 45 SEC
       JSR DSEC       *AND WAIT FOR THE DELAY

BCLR 3,PORTC   *TURN OFF THE DUMP SOLENOID

TOPTME BSET 6,PORTC   *TURN ON (LEAVE ON) THE GEAR MOTOR
       CLR CYCNTR     *CLEAR THE CYCLE COUNTER

CLR CODE       *CLR EEPROM TO INDICATE DISPENSER ACTIVITY
       LDA #$4A       *WRITE OPCODE FOR EEPROM LOCATION $0A
       STA EEADDR
       JSR WRITE      *AND GO WRITE TO THE EEPROM

BSET 1,PORTC   *TURN ON THE PUMP SOLENOID
       BSET 5,PORTC   *TURN ON THE DISPENSER

CLR CNTD       *PREPARE TO USE THE SPECIAL MINUTE TIMER
       CLR TIME6      *THIS TIMER CAN BE PREVENTED FROM COUNTING
       CLR ONESEC     *BY ADDING A "0" (ADD "1" & THE TIMER COUNTS)

LDA #$0A       *START THE 10s TIMER
       STA TIME6

SOAPY  JSR CKCURT     *CHECK THE CURTAIN SWITCH
       BSET 5,PORTC   *TURN ON (LEAVE ON) THE DISPENSER

TST TIME6      *IS THE TIMER DONE ?
       BNE SOAPY

BCLR 5,PORTC   *TURN OFF THE DISPENSER

CLR CNTD       *PREPARE TO USE THE SPECIAL MINUTE TIMER
       CLR ONESEC     *BY ADDING A "0" (ADD "1" & THE TIMER COUNTS)

LDA #$7D       *START THE 125s TIMER (2:05)
       STA TIME6

TOPWSH JSR CKCURT     *CHECK THE CURTAIN SWITCH
       JSR SCUMOFF    *AND DISPENSER SWITCH

TST TIME6      *IS THE TIMER DONE ?
       BNE TOPWSH

BCLR 6,PORTC   *TURN OFF THE GEAR MOTOR

CLR CNTD       *PREPARE TO USE THE SPECIAL MINUTE TIMER
       CLR ONESEC     *BY ADDING A "0" (ADD "1" & THE TIMER COUNTS)
```

```
        LDA #$2D           *THE BALANCE OF 7 MINUTES (45 SEC)
        STA TIME6          *STORE IN THE 'SECONDS' PORTION

SOAPOFF JSR CKCURT         *CHECK THE CURTAIN SWITCH
        JSR SCUMOFF        *AND DISPENSER SWITCH

TST TIME6          *IS THE TIMER DONE ?
        BNE SOAPOFF

CLR CNTD           *PREPARE TO USE THE SPECIAL MINUTE TIMER
        CLR TIME6          *THIS TIMER CAN BE PREVENTED FROM COUNTING
        CLR ONESEC         *BY ADDING A "0" (ADD "1" & THE TIMER COUNTS)

LDA #$07           *BALANCE OF 10 MIN (7 MIN)
        STA TIME7          *STORE IN THE 'MINUTES' PORTION

JSR CIRC           *FINISH WASHING, THEN DO RINSE CYCLES

RTS                *AND THEN RETURN
```

APPENDIX VII. Program Listing for the Routine of Figure 13.

```
*********************** RINSE ROUTINE ***********************
RINSE   BSET 1,PORTC       *THE PUMP MUST BE ON IF STARTING HERE

BRCLR 0,IDENT,NOTOP *BRA IF SGL/DUAL EVAP

BSET 6,PORTC       *TURN ON THE GEAR MOTOR

NOTOP   CLR CNTD           *START THE 60s TIMER
        LDA #$3C
        STA TIME6          *USE THE SPECIAL TIMER

GO60S   JSR CKCURT         *CHECK THE CURTAIN SW AGAIN
        JSR SCUMOFF

TST TIME6          *IS THE TIMER DONE ?
        BNE GO60S

BRCLR 0,IDENT,NOGEAR *BRA IF SGL/DUAL EVAP

BCLR 6,PORTC       *TURN OFF THE GEAR MOTOR

NOGEAR  CLR CNTD           *START THE 30s TIMER
        LDA #$1E
        STA TIME6          *USE THE SPECIAL TIMER

GO30S   JSR CKCURT         *CHECK THE CURTAIN SW AGAIN
        JSR SCUMOFF

TST TIME6          *IS THE TIMER DONE ?
        BNE GO30S

BSET 3,PORTC       *TURN ON THE DUMP

CLR CNTD           *START THE 45s TIMER
        LDA #$2D
        STA TIME6          *WE NEED THE SPECIAL TIMER AGAIN

ENDCYC  BRSET 0,IDENT,TDLST *BRA IF TOP DELIV
```

```
        JSR CKCURT      *CHECK THE CURTAIN SW AGAIN
        BRA SGLST       *BRA, WE WANT THE PUMP ON FOR SGL EVAP

TDLST   BCLR 1,PORTC    *TURN OFF THE PUMP IF TOP DELIV

SGLST   JSR SCUMOFF

TST TIME6       *IS THE 45s TIMER DONE ?
        BNE ENDCYC

BCLR 3,PORTC    *TURN OFF THE DUMP

INC CYCNTR      *INCREMENT THE CYCLE COUNTER

LDA #$06
```

APPENDIX VII.   Program Listing for the Routine of Figure 13.

```
        CMP CYCNTR      *HAVE WE COMPLETED 6 CYCLES ?
        BNE RINSE       *IF NOT, GO DO MORE

CLR CYCNTR      *CLEAR THE COUNTER, WE MIGHT NEED IT AGAIN
        CLR PORTC       *TURN OFF EVERYTHING

BRCLR 1,DISPO,WEDUN *IF WE DIDN'T DISPENSE ANYMORE SOAP, WE'RE DONE
        BCLR 1,DISPO    *CLEAR THE DISPENSE SOAP FLAG
        BRA RINSE       *IF WE DID DISPENSE, GO DO A COMPLETE RINSE

WEDUN   LDA #$FF        *PREPARE TO ERASE EEPROM DISPENSER FLAG
        STA CODE

LDA #$4A        *WRITE OPCODE FOR EEPROM LOCATION $0A
        STA EEADDR
        JSR WRITE       *AND GO WRITE TO THE EEPROM

RTS             *AND RETURN
```

APPENDIX VIII.   Program Listing for the Routine of Figure 14(a)

```
********************************************************
*********** SUBROUTINE TO CHECK THE CURTAIN SWITCH ***********
CKCURT  BRSET 1,IDENT,TWOCRT *USE A DIFFERENT MASK FOR DUAL EVAP

LDA #$10        *MASK ALL BUT THE SGL EVAP CURTAIN
        BRA AMASK

TWOCRT  LDA #$18        *DUAL EVAP, LOOK AT BOTH CURTAINS

AMASK   STA MASK
        JSR READPD      *READ PORTD INPUTS

TST TEMP4       *THIS IS THE 'DEBOUNCED' PORT DATA
        BEQ CURTOK      *BRA IF CURTAIN IS CLOSED

CLR SLOT        *DISABLE THE TIMER IF THE CURTAIN IS OPEN

BCLR 1,PORTC    *TURN OFF PUMP, DON'T WANT SOAP IN THE ICE
```

```
        JSR SCUMOFF     *LET'S SEE IF WE NEED THE DISPENSER ON
        BRA CKCURT      *GO CHECK THE CURTAIN AGAIN

CURTOK  BSET 0,SLOT     *ENABLE THE TIMER (ADD 1 - FOR INCREMENTING)

BSET 1,PORTC    *WE CAN TURN ON (LEAVE ON) THE PUMP

RTS             *CURTAIN IS CLOSED, IT'S OK
```

APPENDIX IX.  Program Listing for the Routine of Figure 14(b)

```
************ SUBROUTINE TO CHECK THE MOMENTARY SWITCH ************
SCUMOFF BRCLR 0,DISPO,NOSOAP *DON'T DISPENSE EXCEPT IN 'CLEAN' MODE

LDA #$01        *LOOK AT PORT D0
        STA MASK        *MASK UNUSED BITS
        JSR READPD      *AND READ THE PORT

BRCLR 0,TEMP4,NOSOAP *BRA IF MOMEMTARY SWITCH ISN'T PRESSED

BSET 1,DISPO    *ALWAYS RINSE AFTER DISPENSING SOAP
        BSET 5,PORTC    *SWITCH MUST BE PRESSED, TURN ON THE DISPENSER
        RTS

NOSOAP  BCLR 5,PORTC    *SWITCH ISN'T PRESSED, TURN OFF DISPENSER
        RTS
```

APPENDIX X.  Program Listing for the Routine of Figure 15

```
***************** RINSE ROUTINE - TOP DELIVERY *****************
TOPRNS  INC CYCNTR      *INCREMENT THE CYCLE COUNTER

BSET 6,PORTC    *TURN ON THE GEAR MOTOR
        BCLR 3,PORTC    *TURN OFF THE DUMP SOLENOID
        BSET 1,PORTC    *TURN ON THE PUMP SOLENOID

LDA #$3C        *RUN FOR 60 SEC
        JSR DSEC

BCLR 6,PORTC    *TURN OFF THE GEAR MOTOR

LDA #$1E        *RUN FOR 30 SEC
        JSR DSEC

BSET 3,PORTC    *TURN ON THE DUMP SOLENOID
        BCLR 1,PORTC    *TURN OFF THE PUMP SOLENOID

LDA #$2D        *PREPARE TO RUN FOR 45 SEC
        JSR DSEC        *AND WAIT FOR THE DELAY

LDA #$06        *CHECK THE NUMBER OF CYCLES
        CMP CYCNTR      *HAVE WE CYCLED 6 TIMES ?
        BNE TOPRNS      *IF NOT DONE, GO BACK AND CLEAN MORE

CLR PORTC       *TURN OFF EVERYTHING

RTS             *AND RETURN
```

APPENDIX XI. Program Listing for the Routine of Figure 16

```
**************** DUMP CYCLE - TOP DELIVERY ***************
TOP45  BSET 3,PORTC    *TURN ON THE DUMP SOLENOID
       BSET 6,PORTC    *TURN ON THE GEAR MOTOR

LDA #$2D        *PREPARE TO RUN FOR 45 SEC
       JSR DSEC        *AND WAIT FOR THE DELAY

BCLR 3,PORTC    *TURN OFF THE DUMP SOLENOID

CLR CNT         *PREPARE TO USE THE MINUTE TIMER
       CLR TIME1
       CLR MINUTE
       LDA #$0A        *SET UP FOR 10 MINUTES
       STA TIME3

BSET 1,PORTC    *TURN ON THE PUMP SOLENOID

RTS             *AND RETURN
```

Having described our invention, we claim:

1. An electronically monitored and controlled ice making machine comprising:
   a) a coolant/refrigerant system comprising at least one compressor, at least one condenser, at least one evaporator, at least one expansion device, at least one hot gas valve for directing hot gases from the compressor to the evaporator, and interconnecting lines therefor:
   b) a water/ice system comprising at least one fresh water inlet at least one water reservoir at least one water circulation mechanism and at least one ice-forming evaporator plate, and interconnecting lines therefpr:
   c) a cleaning system which, once initiated, causes the water/ice system to cycle through a cleaning sequence having at least one wash cycle and at least one rinse cycle; and
   d) an electronic controlling/monitoring system for monitoring and controlling the coolant/refrigerant system, the water/ice system and the cleaning system.

2. The ice machine of claim 1 wherein the cleaning system comprises at least one cleaning/sterilizing solution reservoir, at least one cleaning/sterilizing injection mechanism, and at least one cleaning/sterilizing solution injection line in communication with the water/ice system.

3. The ice machine of claim 1 wherein the cleaning system comprises an instruction to the controlling/monitoring system to repeatedly rinse the water/ice system with fresh water.

4. The ice machine of claim 3 wherein the controlling monitoring system comprises a computer program and the instruction to repeatedly rinse the water/ice system is a sub-routine within this computer program.

5. The ice machine of claim 1 wherein the controlling/monitoring system comprises at least one microprocessor capable of being instructed to operate at least one timing/sequencing mechanism, the at least one fresh water supply inlet at least one dumping solenoid valve, and the at least one water circulation mechanism.

6. The ice machine of claim 2 wherein the cleaning system comprises both a cleaning solution reservoir and a sterilizing solution reservoir and, respectively serving each, separate solution injection mechanisms and separate solution injection lines.

7. The ice machine of claim 6 wherein the injection mechanism comprises a positive displacement pump selected from the group consisting of a gear pump, an oscillating pump, a screw pump, a syringe pump, a piston pump, and a peristaltic pump.

8. The ice machine of claim 2 wherein the cleaning/sterilizing solution injection line is directed into the water reservoir of the water/ice system at a level above the level of water in the reservoir, thereby providing an air gap preventing back up of water from the water/ice system into the cleaning/sterilizing solution reservoir.

9. The ice machine of claim 1 wherein the controlling/monitoring system further comprises a switching mechanism for initiating cleaning.

10. The ice machine of claim 9 wherein the switching mechanism comprises an automatic switching device permitting cleaning initiated by the accumulation of a preset number of harvest counts.

11. The ice machine of claim 9 wherein the switching mechanism comprises a manual switching device permitting cleaning initiated by an operator.

12. The ice making machine of claim 1 wherein the cleaning system comprises at least one cleaning solution reservoir, at least one solution injection mechanism, an electronic control panel, and interconnecting fluid transfer lines and electrical transmission lines contained in an apparatus case separate from other components of the ice making machine, said fluid transfer and electrical transmission lines being capable of interconnect with the other components of the ice-making machine.

13. The ice machine of claim 1 wherein the controlling/monitoring system comprises at least one microprocessor capable of being instructed to operate at least one timing/sequencing mechanism, at least one dumping solenoid valve, and the at least one water circulation mechanism.

14. The ice making machine of claim 1 wherein the coolant/refrigerant system also comprises a refrigerant reservoir, a refrigerant drier, and interconnecting lines therefor.

15. The ice making machine of claim 1 wherein the water/ice system also comprises a water drain and a water drain solenoid valve and a water curtain in close proximity to the ice-forming evaporator plate.

16. A method of automatically cleaning/sterilizing the surfaces of a microprocessor monitored and controlled ice making machine comprising a coolant/refrigerant system, a water/ice system, a cleaning/sterilizing system, and a controlling/monitoring system, which method comprises the steps of:
   a) turning off the coolant/refrigerant system;
   b) initiating an automatic cleaning cycle in which the microprocessor thereafter automatically causes the following steps to occur:
      i) draining any accumulated water from the water-/ice system of the ice making machine:
      ii) recharging the water/ice system with fresh water from a water supply to form a first wash water and initiating water circulation thereof:
      iii) circulating the first wash water throughout the water/ice system for a predetermined period of time to clean surfaces in contact with the first wash water: and
      iv) stopping the circulation of the first wash water and draining the first wash water from the machine, and then:
      v) adding fresh/water to the water/ice system and circulating the fresh water for a period of at least 30 seconds, thereby forming a first rinse solution by rinsing the surfaces previously cleaned.
      vi) draining the first rinse solution from the machine: and then
      vii) recharging the water/ice system with fresh water and automatically initiating a freeze cycle of the ice making machine.

17. The method of claim 16 further comprising, between step i) and step iv), adding a volume of a cleaning/sterilizing solution into the fresh water, thereby forming the first waste water.

18. The method of claim 16 wherein steps v) and vi) are sequentially repeated at least 3 times.

19. The method of claim 17 wherein steps v) and vi) are sequentially repeated at least 3 times.

20. The method of claim 16 wherein the cleaning cycle is initiated manually.

21. The method of claim 16 wherein the cleaning cycle is initiated automatically by a control signal after at least 100 harvest cycles.

22. The method of claim 17 wherein the cleaning/sterilizing solution comprises only a cleaning solution and wherein the method further comprises the addition of fresh water and a sterilizing solution to the water/ice system to form a diluted sterilizing solution, circulating the diluted sterilizing solution for at least 3 minutes, dumping said diluted sterilizing solution and recharging with fresh water to form a second rinse solution, circulating the second rinse solution for at least 3 minutes and then dumping the second rinse solution, thereby completing a second rinse cycle of the water/ice system, and then repeating the second rinse cycle at least 3 times, 23. The method of claim 17 wherein the cleaning/sterilizing solution comprises only a sterilizing solution.

24. The method of claim 19 wherein the cleaning cycle is initiated automatically by a control signal after at least 100 harvest cycles.

25. The method of claim 16 wherein the step of turning off the coolant/refrigerant system is accomplished by a control signal from the microprocessor after initiation of the automatic cleaning cycle.

26. The method of claim 16 wherein the water/ice system comprises at least one water reservoir, at least one water circulation pump, at least one distributor and at least one ice-forming evaporate plate capable of forming desired ice staples, and the step of circulating the first wash water throughout the water/ice system circulates the first wash water through the pump and distributor and over the ice-forming evaporator plate and into the reservoir.

27. A microprocessor monitored and controlled ice making machine comprising:
   a) a coolant/refrigerant system comprising at least one compressor, at least one condenser, at least one evaporator, at least one expansion device, at least one hot gas valve for directing hot gases from the compressor to the evaporator, and interconnecting lines therefor;
   b) a water/ice system comprising at least one fresh water inlet, at least one water reservoir, at least one water circulation mechanism and at least one ice-forming evaporator plate, and interconnecting lines therefor;
   c) a cleaning system which, once initiated causes the water/ice system to cycle through a cleaning sequence having at least one wash cycle and at least one rinse cycle; and
   d) an electronic controlling/monitoring system for monitoring and controlling the coolant/refrigerant system, the water/ice system and the cleaning system.

28. A microprocessor monitored and controlled automatic ice making machine comprising:
   a) a coolant/refrigerant system comprising at least one compressor, at least one condenser, at least one evaporator, at least one expansion device, at least one hot gas valve for directing hot gases from the compressor to the evaporator, and interconnecting lines therefor:
   b) a water/ice system comprising at least one fresh water inlet, at least one water reservoir, at least one water circulation mechanism and at least one ice-forming evaporator plate, and interconnecting lines therefor;
   c) an automatic cleaning system; and
   d) an electronic controlling/monitoring system for monitoring and controlling the coolant/refrigerant system, the water/ice system and the automatic cleaning system, the controlling/monitoring system and automatic cleaning system being capable of automatically cleaning the water/ice system after the clearing system is initiated by a method selected from the group consisting of manual initiation and automatic initiation.

29. A microprocessor monitored and controlled automatic ice making machine comprising:
   a) a coolant/refrigerant system comprising at least one compressor, at least one condenser, at least one evaporator, at least one expansion device, at least one hot gas valve for directing hot gases from the compressor to the evaporator, and interconnecting lines therefor;
   b) a water/ice system comprising at least one fresh water inlet, at least one water reservoir, at least one water circulation pump, at least one distributor at least one ice-forming evaporator plate capable of forming desired ice shapes, and at least one dump valve, and interconnecting lines therefor:

c) a cleaning system: and d) a controlling/monitoring system, comprising a microprocessor, for monitoring and controlling the coolant/refrigerant system, the water/ice system and the cleaning system the cleaning system comprising instructions to the controlling/monitoring system to cause the following operations to occur automatically and successively once a cleaning cycle is initiated:

i) operating the pump to circulate a wash water solution from the reservoir through other components of the water/ice system and back into the reservoir:

ii) energizing the dump valve to allow the wash water solution to be transferred from the reservoir to a drain:

iii) allowing fresh water as a rinse water to enter the reservoir from the fresh water inlet:

iv) operating the pump to circulate the rinse water from the reservoir through the other components the water/ice system and back into the reservoir;

v) energizing the dump valve to allow the rinse water to be transferred from the reservoir to a drain; and vi) repeating steps iii), iv), and v) at least once.

30. A microprocessor monitored and controlled ice making machine comprising:

a) a coolant/refrigerant system comprising at least one compressor, at least one condenser, at least one evaporator, at least one expansion device, at least one hot gas valve for directing hot gases from the compressor to the evaporator, and interconnecting lines therefor:

b) a water/ice system comprising at least one fresh water inlet, at least one water reservoir, at least one water circulation pump, at least one distributor and at least one ice-forming evaporator plate, and interconnecting lines therefor:

c) a cleaning/sterilizing system which, once initiated, causes the water/ice system to cycle through a cleaning sequence having at least one wash cycle and at least one rinse cycle: and d) an electronic controlling/monitoring system for monitoring and controlling the coolant/refrigerant system, the water/ice system and the cleaning/sterilizing system.

* * * * *

UNITED STATES PATENT AND TRADEMARK OFFICE
CERTIFICATE OF CORRECTION

PATENT NO. : 5,408,834
DATED : April 25, 1995
INVENTOR(S) : Charles E. Schlosser et al.

It is certified that error appears in the above-indentified patent and that said Letters Patent is hereby corrected as shown below:

In column 1, line 23 delete the first occurrence of "and" and substitute --and/or--.

In column 1, line 24 after machine insert --,--.

In column 1, line 24 after "which" delete ",".

In column 2, line 29, after "mold" insert --,--.

In column 3, line 20 after "4,489,567" insert --,--.

In column 5, line 14 delete "sterilizating" and substitute --sterilizing--.

In column 9, line 11 delete "coolant" and substitute --coolant/refrigerant--.

In column 10, line 12 after "56" insert --,--.

In column 11, line 43 after "like" insert --,--.

In column 12, line 21 delete "determines" and substitute --determine--.

In column 12, line 28 delete "sanitizing" and substitute --sterilizing--.

UNITED STATES PATENT AND TRADEMARK OFFICE
CERTIFICATE OF CORRECTION

PATENT NO. : 5,408,834
DATED : April 25, 1995
INVENTOR(S) : Charles E. Schlosser et al.   Page 2 of 5

It is certified that error appears in the above-indentified patent and that said Letters Patent is hereby corrected as shown below:

In column 13, line 25 after "off" insert --the--.

In column 14, line 64 after "the" insert --automatic--.

In column 17, line 26 delete "33".

In column 17, line 30 delete "arrangement" and substitute --arrangements--.

In the Claims

In claim 1, line 10 after "inlet" insert --,--.

In claim 1, line 10 after "reservoir" insert --,--.

In claim 1, line 13 delete "therefpr" and substitute --therefor--.

In claim 4, line 1 after "controlling" insert --/--.

In claim 5, line 5 after "inlet" insert --,--.

UNITED STATES PATENT AND TRADEMARK OFFICE
CERTIFICATE OF CORRECTION

PATENT NO. : 5,408,834
DATED : April 25, 1995
INVENTOR(S) : Charles E. Schlosser et al.   Page 3 of 5

It is certified that error appears in the above-indentified patent and that said Letters Patent is hereby corrected as shown below:

In the Claims (cont'd)

In claim 12, line 5 after the second occurrence of "lines" insert --,--.

In claim 12, line 8 delete "interconnect" and substitute --interconnection--.

In claim 15, line 3 after "valve" insert --,--.

In claim 16, line 12 delete ":" and substitute --;--.

In claim 16, line 15 delete ":" and substitute --;--.

In claim 16, line 19 delete ":" and substitute ";".

In claim 16, line 20 delete ",".

In claim 16, line 22 delete ":" and substitute --;--.

In claim 16, line 23 delete the first occurrence of "/".

In claim 16, line 26 delete "." and substitute --;--.

In claim 16, line 28 delete ":" and substitute --;--.

UNITED STATES PATENT AND TRADEMARK OFFICE
CERTIFICATE OF CORRECTION

PATENT NO. : 5,408,834
DATED : April 25, 1995
INVENTOR(S) : Charles E. Schlosser et al.

It is certified that error appears in the above-indentified patent and that said Letters Patent is hereby corrected as shown below:

In the Claims (cont'd)

In claim 17, line 4 delete "waste" and substitute --wash--.

In claim 22, line 13 delete "," and substitute --.--.

In claim 26, line 4 delete "evaporate" and substitute --evaporator--.

In claim 26, line 5 delete "staples" and substitute --shapes--.

In claim 27, line 14 after "initiated" insert --,--.

In claim 28, line 8 delete ":" and substitute --;--.

In claim 28, line 21 delete "clearing" and substitute --cleaning--.

In claim 29, line 11, after "distributor" insert --,--.

In claim 29, line 14 delete ":" and substitute --;--.

In claim 29, line 15 delete ":" and substitute --;--.

UNITED STATES PATENT AND TRADEMARK OFFICE
CERTIFICATE OF CORRECTION

PATENT NO. : 5,408,834
DATED : April 25, 1995
INVENTOR(S) : Charles E. Schlosser et al.   Page 5 of 5

It is certified that error appears in the above-indentified patent and that said Letters Patent is hereby corrected as shown below:

In the Claims (cont'd)

In claim 29, line 19 after the first occurrence of "system" insert --,--.

In claim 29, line 27 delete ":" and substitute --;--.

In claim 29, line 30 delete ":" and substitute --;--.

In claim 29, lines 34-35 after "components" insert --of--.

In claim 30, line 8 delete ":" and substitute --;--.

In claim 30, line 13 delete ":" and substitute --;--.

In claim 30, line 17 delete ":" and substitute --;--.

Signed and Sealed this

Twenty-second Day of July, 1997

Attest:

BRUCE LEHMAN

Attesting Officer          Commissioner of Patents and Trademarks